US007675795B2

(12) United States Patent
Koyama

(10) Patent No.: US 7,675,795 B2
(45) Date of Patent: Mar. 9, 2010

(54) SEMICONDUCTOR DEVICE, WIRELESS CHIP, IC CARD, IC TAG, TRANSPONDER, BILL, SECURITIES, PASSPORT, ELECTRONIC APPARATUS, BAG, AND GARMENT

(75) Inventor: Jun Koyama, Sagamihara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 633 days.

(21) Appl. No.: 10/591,275

(22) PCT Filed: Mar. 9, 2005

(86) PCT No.: PCT/JP2005/004584

§ 371 (c)(1),
(2), (4) Date: Aug. 31, 2006

(87) PCT Pub. No.: WO2005/088532

PCT Pub. Date: Sep. 22, 2005

(65) Prior Publication Data

US 2007/0171693 A1    Jul. 26, 2007

(30) Foreign Application Priority Data

Mar. 11, 2004    (JP) .............................. 2004-068450

(51) Int. Cl.
*G11C 7/00* (2006.01)

(52) U.S. Cl. ....................... 365/192; 365/145; 365/102

(58) Field of Classification Search ................. 365/192, 365/104; 340/2.1–2.8, 10.1–10.6, 10.51, 340/572.1–572.9; 700/215, 221, 225, 227; 455/150.1, 151.1; 235/375–385, 492
See application file for complete search history.

(56) References Cited

U.S. PATENT DOCUMENTS

| 5,525,991 | A   |   | 6/1996  | Nagura et al.           |
|-----------|-----|---|---------|-------------------------|
| 6,046,926 | A   | * | 4/2000  | Tanaka et al. ... 365/145 |
| 6,097,622 | A   | * | 8/2000  | Shimizu et al. ... 365/145 |
| 6,809,952 | B2  |   | 10/2004 | Masui                   |

(Continued)

FOREIGN PATENT DOCUMENTS

JP        11-073481        3/1999

(Continued)

OTHER PUBLICATIONS

Office Action (Application No. 200580007608.6) Dated Nov. 14, 2008.

(Continued)

*Primary Examiner*—Richard Elms
*Assistant Examiner*—Harry W Byrne
(74) *Attorney, Agent, or Firm*—Eric J. Robinson; Robinson Intellectual Property Law Office, P.C.

(57) ABSTRACT

The invention provides an ID chip to which data can be written only once in order to maintain high security as a non-contact type ID chip to which signals are inputted wirelessly from an antenna. A non-contact type ID chip includes a nonvolatile FeRAM in the chip. Data representative of whether data is written or not to the FeRAM is written when writing identification data, thereby data cannot be written additionally to the FeRAM of the ID chip once the data has been written.

14 Claims, 29 Drawing Sheets

U.S. PATENT DOCUMENTS

| | | |
|---|---|---|
| 2001/0026187 A1 | 10/2001 | Oku |
| 2003/0183699 A1* | 10/2003 | Masui ........................ 235/492 |
| 2005/0157529 A1 | 7/2005 | Iwata et al. |
| 2005/0174845 A1 | 8/2005 | Koyama et al. |
| 2005/0180187 A1 | 8/2005 | Koyama |

FOREIGN PATENT DOCUMENTS

| | | |
|---|---|---|
| JP | 11-297963 | 10/1999 |
| JP | 2000-020665 | 1/2000 |
| JP | 2003-163331 | 6/2003 |
| WO | WO 03/103058 | 12/2003 |

OTHER PUBLICATIONS

International Search Report (Application No. PCT/JP2005/004584) dated Apr. 26, 2005.
Written Opinion (Application No. PCT/JP2005/004584) dated Apr. 26, 2005.

* cited by examiner

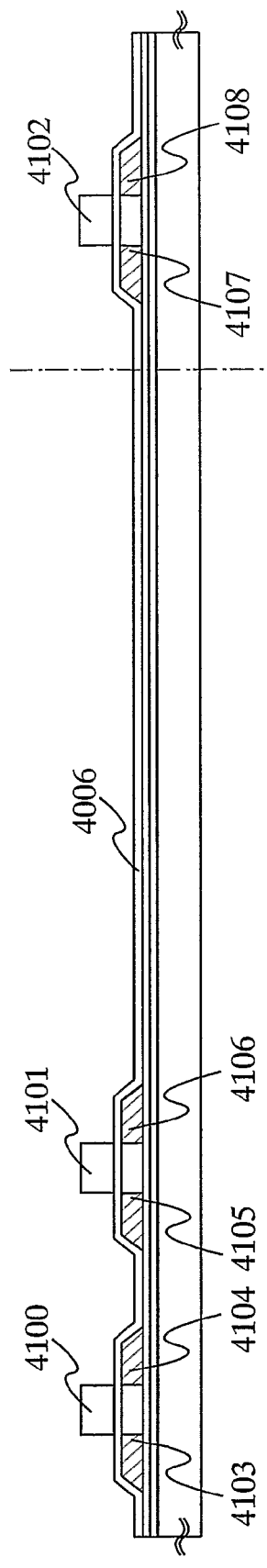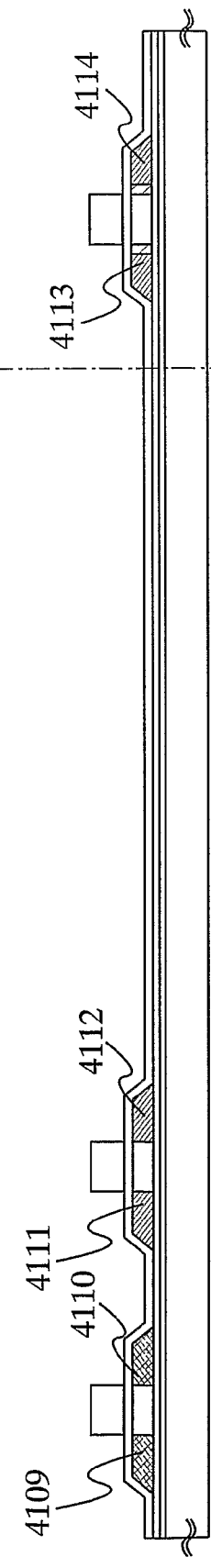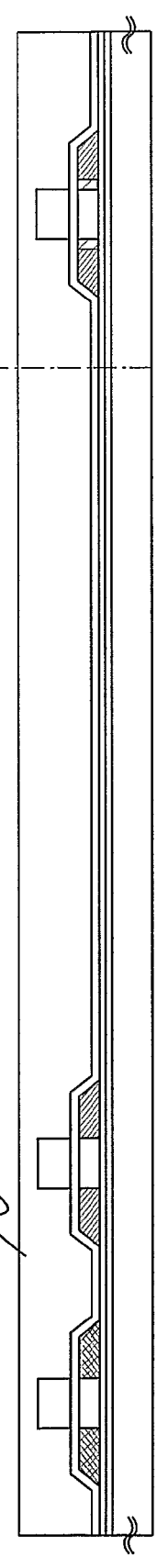

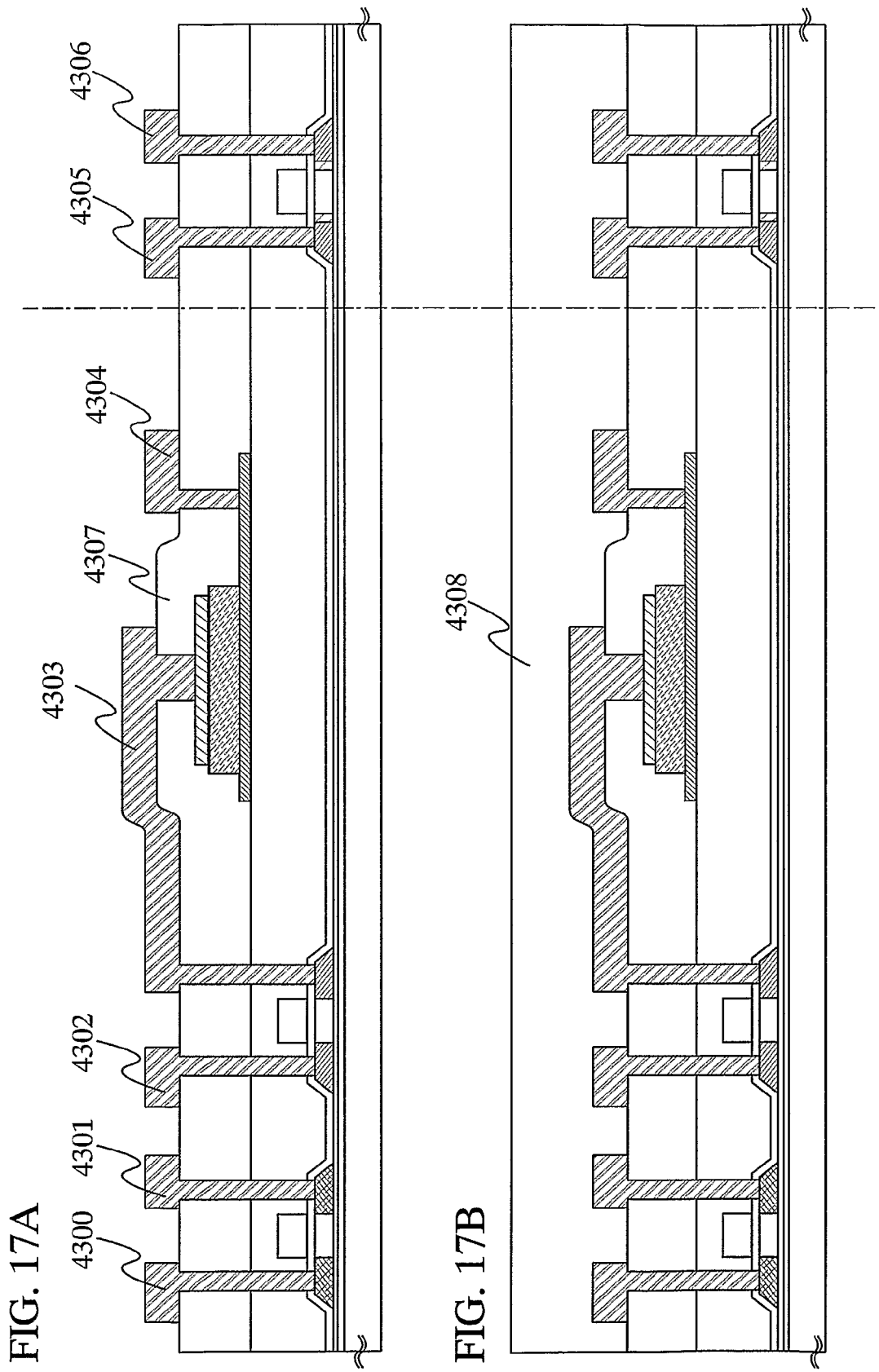

SEMICONDUCTOR DEVICE, WIRELESS CHIP, IC CARD, IC TAG, TRANSPONDER, BILL, SECURITIES, PASSPORT, ELECTRONIC APPARATUS, BAG, AND GARMENT

TECHNICAL FIELD

The present invention relates to a semiconductor device used as an IC chip (hereinafter also referred to as an ID chip) capable of storing needed data in a memory circuit or reading data by a non-contact means such as wireless communication. In particular, the invention relates to a semiconductor device used as an ID chip formed over an insulating substrate such as a glass or plastic substrate.

BACKGROUND ART

With the development of computer technologies and the improvement of image recognition technologies, data identification utilizing media such as bar codes has been widely used for identification of product data and the like. It is expected that the amount of data to be identified will be further increased in the future. On the other hand, data identification utilizing bar codes and the like is disadvantageous in that a bar code reader is required to be in contact with bar codes, and the amount of data stored in bar codes cannot be increased much. Therefore, non-contact data identification and an increase in the storage capacity of media are demanded.

In view of the foregoing, an ID chip using an IC has been developed in recent years. The ID chip stores required data in a memory circuit of an IC chip and the data is read by a non-contact means, generally by a wireless means. It is expected that practical application of such an ID chip will simplify commercial distribution and the like and reduce the cost while maintaining high security.

An identification system using an ID chip is briefly described with reference to FIG. 4. FIG. 4 is a schematic view showing an identification system for obtaining identification data of a bag without contact. An ID chip 401 storing specific identification data is attached to or incorporated in a bag 404. Electromagnetic waves are transmitted from an antenna unit 402 of an interrogator (also called a reader/writer) 403 to the ID chip 401. Receiving the electromagnetic waves, the ID chip 401 sends its identification data back to the antenna unit 402. The antenna unit 402 transmits the received identification data to the interrogator 403, and the interrogator 403 determines the identification data. In this manner, the interrogator 403 can obtain the data of the bag 404. Such a system enables distribution management, calculation, prevention of counterfeit goods, and the like.

The ID chip has, for example, a configuration shown in FIG. 2. A semiconductor device 200 used as an ID chip includes an antenna circuit 201, a rectifying circuit 202, a stabilizing power source circuit 203, a modulation circuit 204, an amplifier 205, a logic circuit 206, a demodulation circuit 207, an amplifier 208, a logic circuit 209, a memory control circuit 210, and a memory circuit 211. The antenna circuit 201 includes an antenna coil 301 and a tuning capacitor 302 (FIG. 3A). The rectifying circuit 202 includes diodes 303 and 304, and a smoothing capacitor 305 (FIG. 3B).

The operation of such an ID chip is described hereinafter. An AC signal received by the antenna circuit 201 is half-wave rectified by the diodes 303 and 304, and then smoothed by the smoothing capacitor 305. The smoothed voltage which has many ripples is stabilized by the stabilizing power source circuit 203, and the stabilized voltage is supplied to the modulation circuit 204, the amplifier 205, the logic circuit 206, the demodulation circuit 207, the amplifier 208, the logic circuit 209, the memory control circuit 210, and the memory circuit 211. Meanwhile, a signal received by the antenna circuit 201 is inputted as a clock signal to the logic circuit 209 through the amplifier 208. A signal inputted from the antenna circuit 201 is demodulated by the demodulation circuit 207 and inputted as data to the logic circuit 209.

The data inputted to the logic circuit 209 is decoded. The interrogator encodes data by deformable mirror code, NRZ-L code or the like, and the logic circuit 209 decodes the data. The decoded data is transmitted to the memory control circuit 210, thereby data stored in the memory circuit 211 is read. The memory circuit 211 is required to be a nonvolatile memory circuit such as a mask ROM, which is capable of holding data even when a power supply is turned off. The memory circuit 211 stores, for example, 16-byte data having 4-byte family code representing the ID chip sequence, 4-byte application code, and two kinds of 4-byte user codes set by users (see FIG. 12A).

The frequency of a transmitted and received signal is 125 kHz, 13.56 MHz, 915 MHz, or 2.45 GHz each having an ISO standard and the like. In addition, modulation and demodulation systems for transmitting and receiving signals are also standardized. An example of such an ID chip is disclosed in Patent Document 1. [Patent Document 1] Japanese Patent Laid-Open No. 2001-250393

The aforementioned conventional semiconductor device as an ID chip has the following problems. If a mask ROM is used as a memory circuit, data cannot be written except during the manufacturing of a chip. Therefore, an ID chip to which data can be written other than during manufacturing is in demand.

If an EEPROM is used as a memory circuit, a user can freely rewrite data but this also allows people other than the original user to rewrite data for identification which should not be rewritten, thereby making forgery possible. Therefore, in order to prevent such forgery, an ID chip to which data can be written only once is in demand.

DISCLOSURE OF INVENTION

In view of the aforementioned, the invention provides a semiconductor device used as an ID chip to which data can be rewritten only once. The invention also provides a semiconductor device used as an ID chip to which data can be written other than during manufacturing.

According to the invention, a memory circuit is constituted by a nonvolatile memory utilizing a ferroelectric, and a control circuit is provided which allows data to be written only once to the memory circuit. By using a nonvolatile memory utilizing a ferroelectric, data can be written and read at a higher speed relatively to what is called a flash memory and also the reliability can also be improved.

According to the invention, a modulation circuit, a demodulation circuit, a logic circuit, and a memory circuit are formed over an insulating substrate, the modulation circuit and the demodulation circuit are electrically connected to an antenna circuit, the demodulation circuit is connected to the logic circuit, and the memory circuit stores an output signal of the logic circuit. The memory circuit is a FeRAM circuit including a ferroelectric capacitor and a control circuit that allows data to be written only once to the memory circuit.

According to the invention, a modulation circuit, a demodulation circuit, a logic circuit, and a memory circuit are formed over an insulating substrate, the modulation circuit and the demodulation circuit are electrically connected to an antenna circuit, the demodulation circuit is connected to the logic circuit, and the memory circuit stores an output signal of the logic circuit. The memory circuit is a FeRAM circuit including a ferroelectric capacitor, and the logic circuit controls data writing to the memory circuit based on the data stored in the memory circuit.

The semiconductor device includes a memory circuit that is constituted by memory cells. Each memory cell includes two transistors and two ferroelectric capacitors.

The semiconductor device includes a memory circuit that is constituted by memory cells. Each memory cell includes one transistor and one ferroelectric capacitor.

The semiconductor device includes the modulation circuit, the demodulation circuit, the logic circuit and the memory circuit. At least one of the aforementioned circuits is constituted by a thin film transistor (hereinafter also referred to as a TFT).

The semiconductor device includes the antenna circuit, the modulation circuit, the demodulation circuit, the logic circuit and the memory circuit which are integrally formed over the same insulating substrate. Otherwise, the modulation circuit, the demodulation circuit, the logic circuit, and the memory circuit are integrally formed over the same insulating substrate while the antenna circuit is formed on another insulating substrate.

The semiconductor device includes the antenna circuit which is formed above at least one of the followings: the modulation circuit, the demodulation circuit, the logic circuit, and the memory circuit.

According to the invention, an ID chip refers to a semiconductor chip used for identification, which is used for a wireless chip, an IC chip, an IC card, a transponder and the like such as a wireless tag and an RFID.

As described above, according to the invention, data can be written to the memory circuit in the ID chip only once. In this manner, data forgery of the ID chip can be prevented and a semiconductor device used as an ID chip with ensured security can be formed. Moreover, a semiconductor device used as an ID chip to which data can be written other than in manufacturing can be provided.

BRIEF DESCRIPTION OF DRAWINGS

FIGS. 15A to 15C are sectional diagrams showing the manufacturing steps of the invention.

FIGS. 17A and 17B are sectional diagrams showing the manufacturing steps of the invention.

BEST MODE FOR CARRYING OUT THE INVENTION

Figure 1:
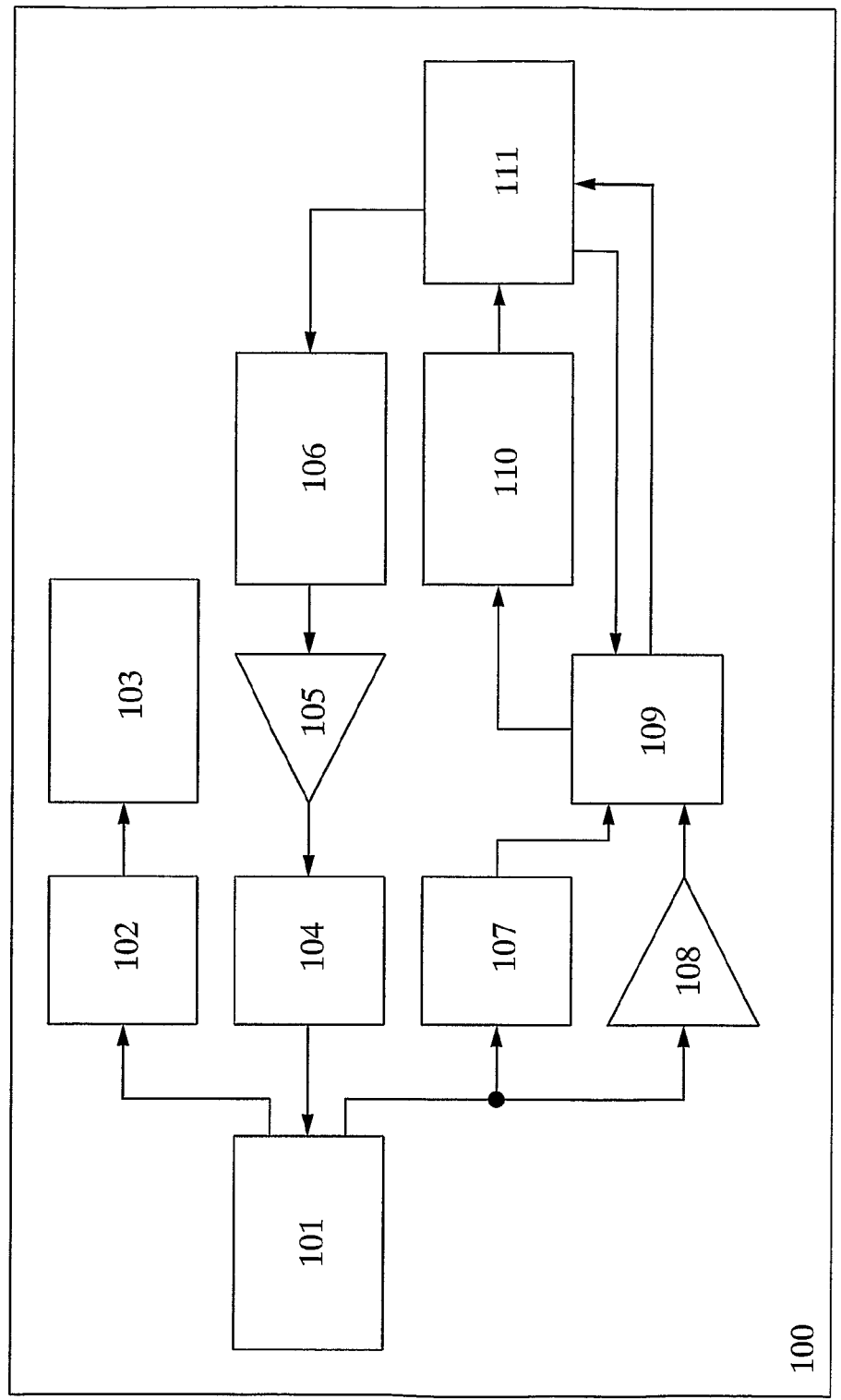
FIG. 1 is a block diagram showing a configuration of the semiconductor device of the invention.
Figure 2:
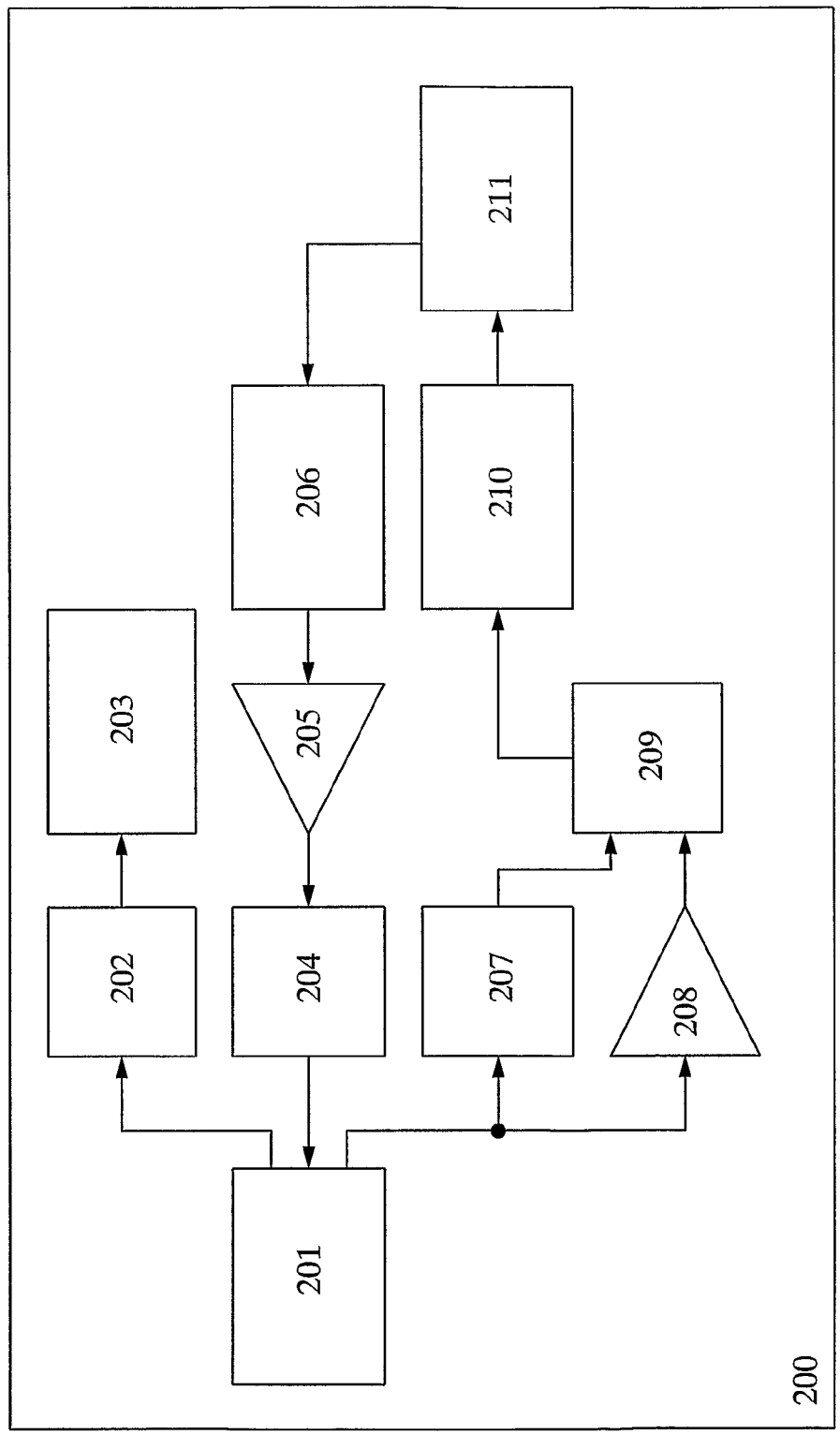
FIG. 2 is a block diagram showing a configuration of a conventional semiconductor device.

Although the invention will be fully described in embodiment mode with reference to the accompanying drawings, it is to be understood that various changes and modifications will be apparent to those skilled in the art. Therefore, unless such changes and modifications depart from the scope of the invention, they should be construed as being included therein. Note that identical portions in the drawings are denoted by the same reference numerals and detailed descriptions thereof are omitted.

The semiconductor device of the invention is described hereafter. In the following description, a RAM using a ferroelectric is referred to as a FeRAM (Ferroelectric RAM).

Figure 3A:
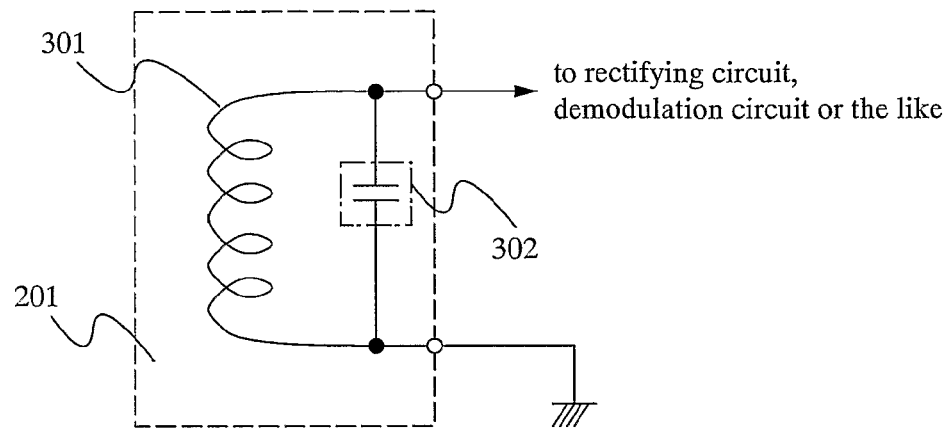
FIGS. 3A and 3B are block diagrams showing configurations of a conventional semiconductor device.
Figure 3B:
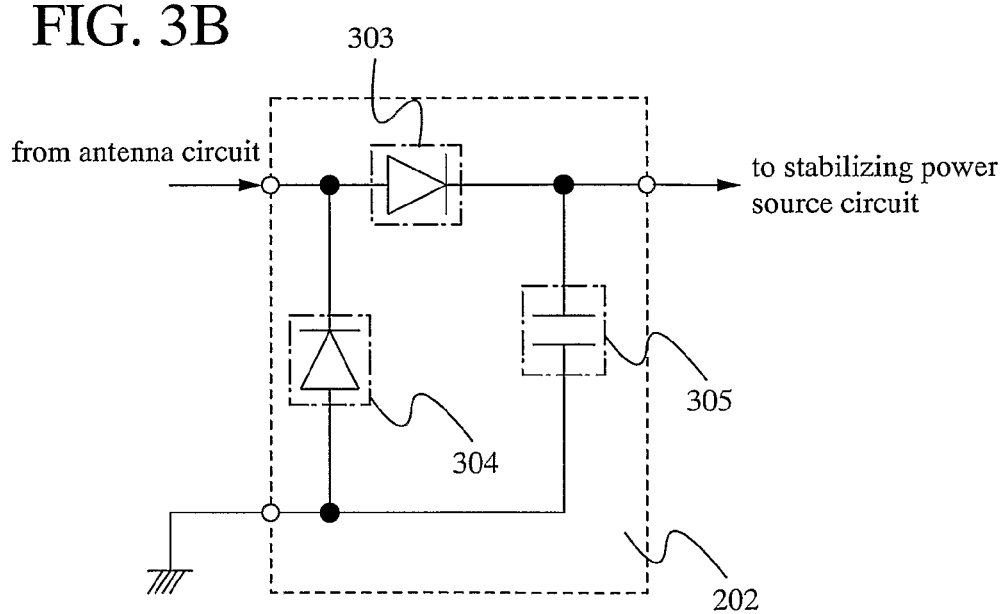
Figure 4:
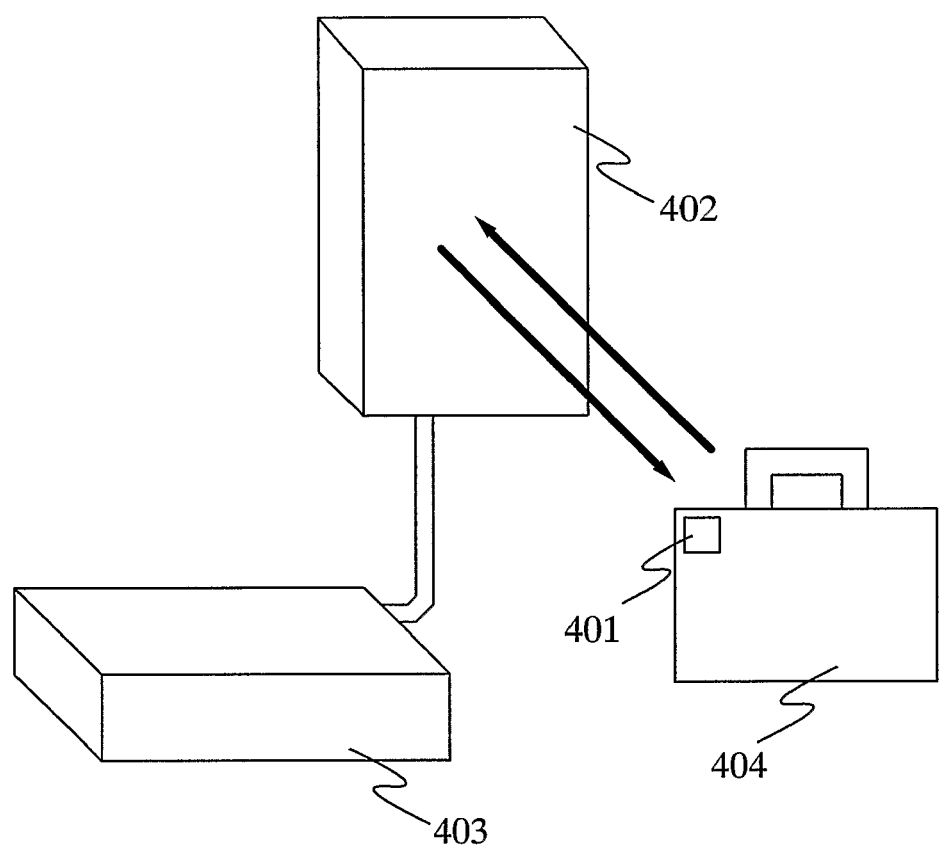
FIG. 4 is a schematic view of an RF tag system.

In FIG. 1, a semiconductor device 100 used as an ID chip includes an antenna circuit 101, a rectifying circuit 102, a stabilizing power source circuit 103, a modulation circuit 104, an amplifier 105, a logic circuit 106, a demodulation circuit 107, an amplifier 108, a logic circuit 109, a FeRAM control circuit 110, and a FeRAM circuit 111. The antenna circuit 101 is similar to the conventional technique shown in FIG. 3A. The rectifying circuit 102 is similar to the conventional technique shown in FIG. 3B. In this embodiment mode, the antenna circuit is formed over the semiconductor device 100, however, the invention is not limited to this and the antenna circuit may be connected to the outside of the semiconductor device 100. The chip of the invention mounting an antenna is also referred to as a wireless chip.

The operation of such an ID chip is described below.

An AC signal received by the antenna circuit 101 is rectified and smoothed by the rectifying circuit 102. The smoothed voltage including a number of ripples is stabilized by the stabilizing power source circuit 103. The stabilized voltage is supplied to the amplifier 105, the demodulation circuit 107, the amplifier 108, and the logic circuit 109.

A signal inputted from the antenna circuit 101 is logically operated by the logic circuit 109 and then inputted to the FeRAM circuit 111. The logic circuit 109 determines, the presence or absence of writing, an address and the like to the FeRAM control circuit 110. Data is written to the FeRAM circuit 111 based on the instruction of the FeRAM control circuit 110.

When an interrogator retrieves data stored in the FeRAM circuit 111, the following operation is performed. An AC signal received by the antenna circuit 101 is rectified and smoothed by the rectifying circuit 102. The smoothed voltage including a number of ripples is stabilized by the stabilizing power source circuit 103. The stabilized voltage is supplied to the modulation circuit 104, the amplifier 105, the logic circuit 106, the demodulation circuit 107, the amplifier 108, the logic circuit 109, the FeRAM control circuit 110, and the FeRAM circuit 111. Meanwhile, the AC signal received by the antenna circuit is inputted to the logic circuit 109 through the amplifier 108 and logically operated. Then, the FeRAM control circuit 110 is controlled by using a signal from the logic circuit 109, thereby the data stored in the FeRAM circuit 111 is retrieved. Next, the data retrieved from the FeRAM circuit 111 is processed by the logic circuit 106 and amplified by the amplifier 105, then the modulation circuit 104 operates. The data is processed according to the standardized method such as ISO14443, ISO15693, ISO18000 and the like, however, it may be processed using another method as long as the compatibility with the interrogator is ensured.

When the modulation circuit 104 operates, impedance of the antenna circuit 101 changes. Accordingly, a signal from the interrogator that is reflected by the antenna circuit 101 changes. When the interrogator reads this change, the data stored in the FeRAM circuit 111 of the semiconductor device 100 can be obtained. Such a modulation method is referred to as a load modulation method.

Figure 5:
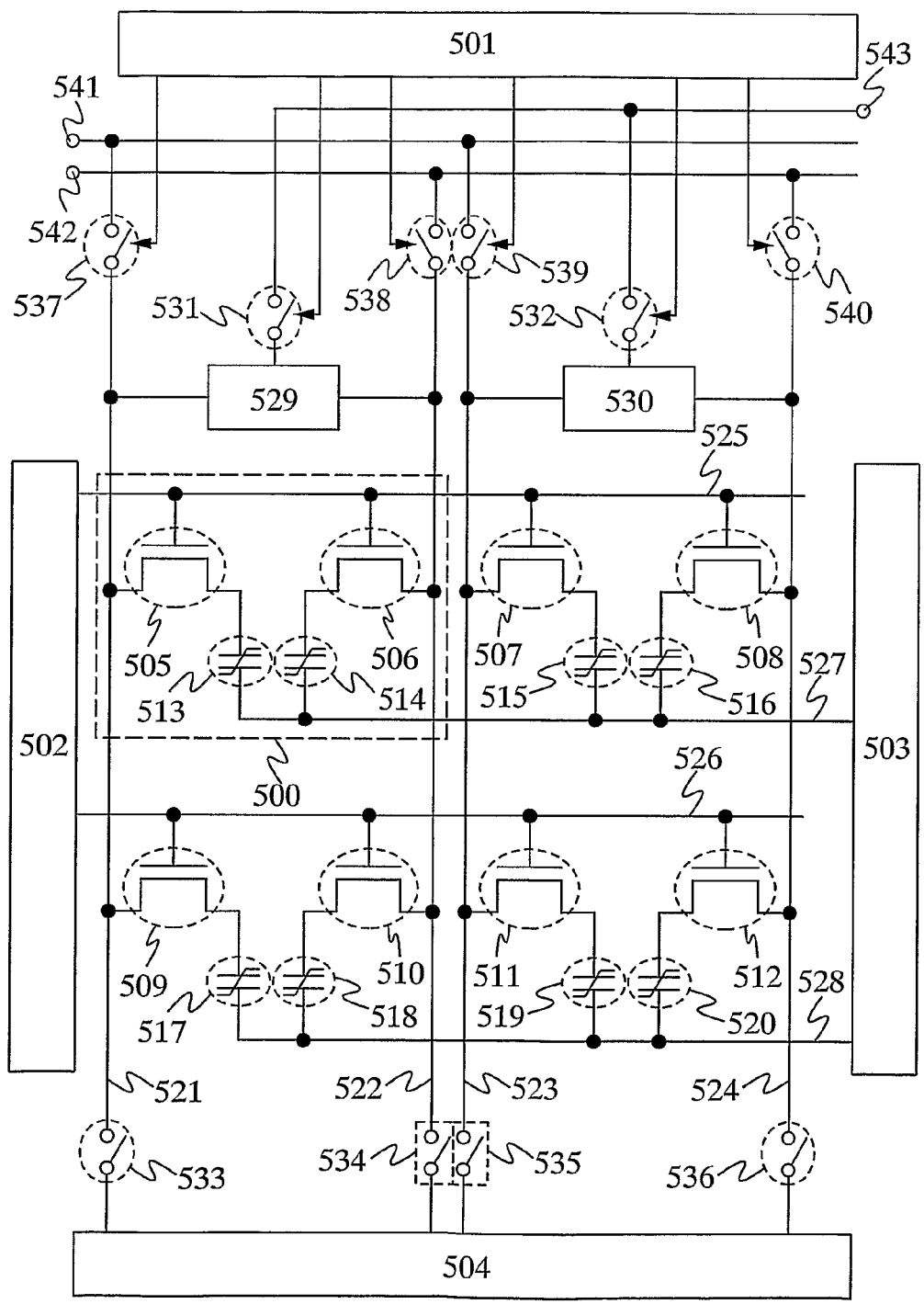
FIG. 5 shows a circuit configuration of a FeRAM having a 2T2C method.

Hereinafter described with reference to FIG. 5 is an operation of the FeRAM circuit. In FIG. 5, a FeRAM circuit is formed by a 2T2C method (a method that one memory cell is constituted by two transistors and two ferroelectric capacitors). The FeRAM circuit in FIG. 5 includes a 4-bit memory circuit for simplification, however, the invention is not limited to 4-bit. The FeRAM circuit shown in FIG. 5 includes a bit line decoder 501, a word line decoder 502, a plate line decoder 503, a precharge circuit 504, N-channel memory transistors 505 to 512 (hereinafter abbreviated as transistors 505 to 512), ferroelectric capacitors 513 to 520, bit lines 521 to 524, word lines 525 and 526, plate lines 527 and 528, sense amplifiers 529 and 530, sense amplifier selecting switches 531 and 532, precharge switches 533 to 536, bit line selecting switches 537 to 540, input terminals 541 and 542, and an output terminal 543.

Figure 6:
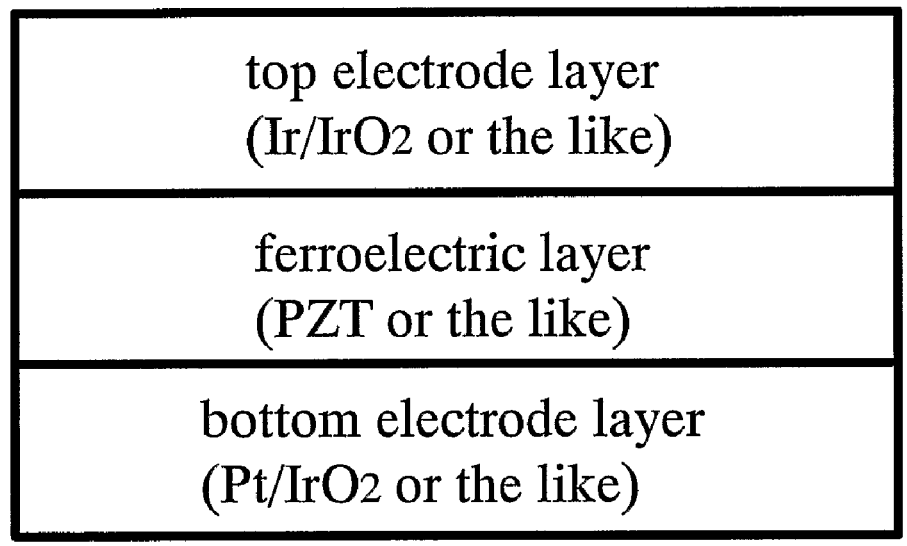
FIG. 6 shows a structure of the FeRAM.

A ferroelectric capacitor included in the memory cell has a three-layer structure as shown in FIG. 6, that is, a bottom electrode layer formed of Pt/IrO$_2$ and the like, a ferroelectric layer formed of PZT (PbZrTiO$_3$) and the like, and a top electrode layer formed of Ir/IrO$_2$ and the like. It is preferable for forming PZT favorably that a grating constant of a base film be close to that of PZT. Consequently, Pt/IrO$_2$ is selected.

Figure 8:
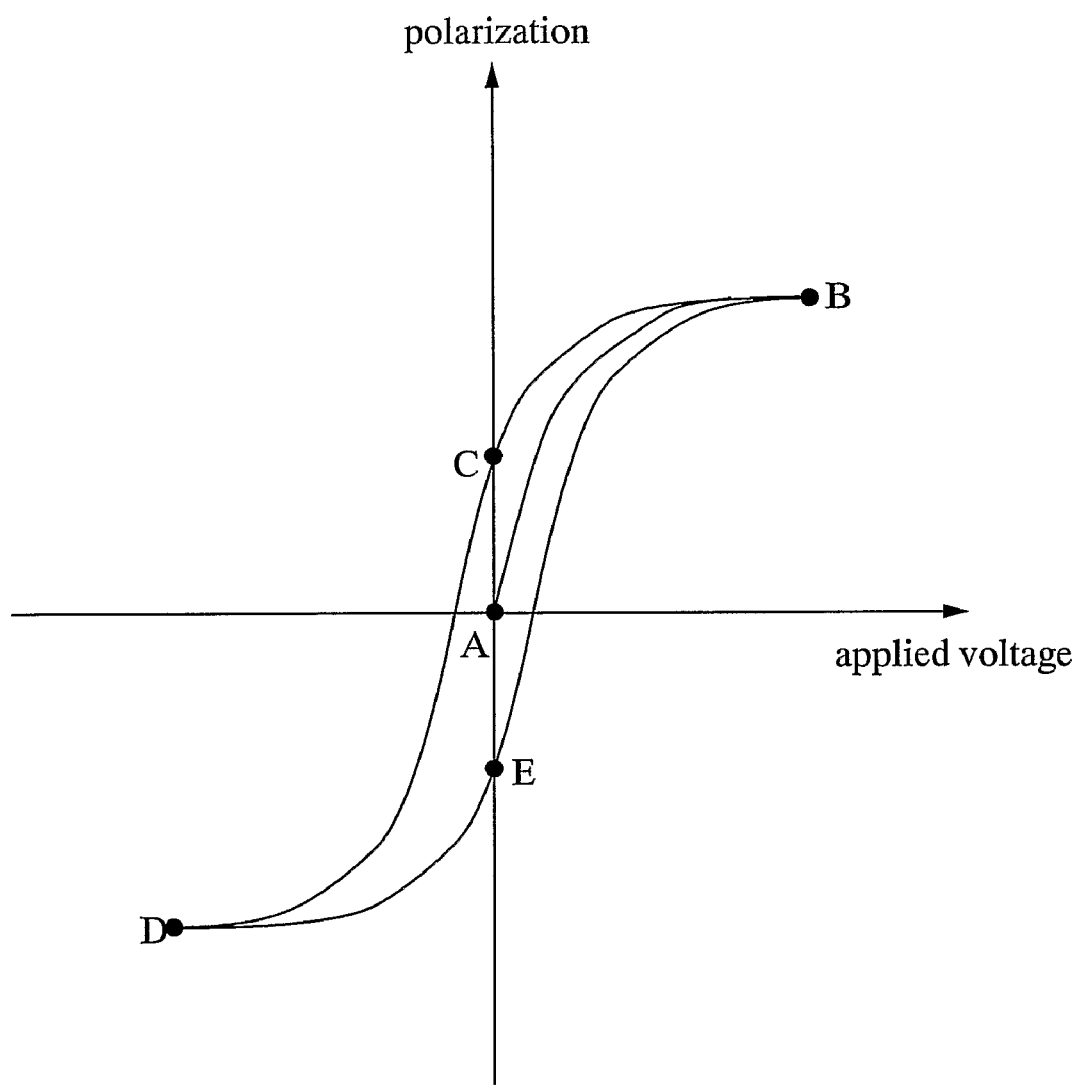
FIG. 8 is a diagram showing hysteresis of a ferroelectric material.

A ferroelectric capacitor has a hysteresis polarizing characteristic depending on voltage, which is shown in FIG. 8. The FeRAM forms a nonvolatile memory by utilizing the hysteresis. The following description is one representation of a memory cell 500 constituted by transistors 505 and 506.

Here, the case where the memory cell outputs one of a binary digital signal is described. In the following description, a high potential signal is denoted as "1" while a low potential signal is denoted as "0". First, data is written so that the memory cell 500 outputs "1". A high potential (for example, VDD) is applied to the input terminal 541 while a low potential (for example, GND) is applied to the input terminal 542. Next, the bit line decoder 501 operates and the bit line selecting switches 537 and 538 are turned ON. Accordingly, a high potential is applied to the bit line 521 while a low potential is applied to the bit line 522. At this time, the plate line 527 has an intermediate potential (for example, VDD/2). Next, the word line decoder 502 operates to select the word line 525. Accordingly, the transistors 505 and 506 are turned ON, thereby the bit line 521 and the ferroelectric capacitor 513 are short-circuited and the bit line 522 and the ferroelectric capacitor 514 are short-circuited. Therefore, VDD/2 and −VDD/2 are applied to the ferroelectric capacitors 513 and 514 respectively.

The aforementioned states of the ferroelectric capacitors 513 and 514 correspond to a point B and a point D in FIG. 8 respectively. Next, the same potential as the plate line 527 (here, VDD/2) is applied to the input terminals 541 and 542. Since the transistors 505 and 506 remain ON, a voltage applied between the terminals of the ferroelectric capacitors 513 and 514 is "0". Accordingly, the states of the ferroelectric capacitors 513 and 514 correspond to a point C and a point E in FIG. 8 respectively. Then, the word line decoder 502 operates to turn OFF the transistors 505 and 506. In this manner, data is stored in the memory cell 500.

When reading data in the memory cell 500, the bit line selecting switches 537 and 538 are turned OFF, the input terminals 541 and 542 and the bit lines 521 and 522 are cut off. Next, the precharge switches 533 and 534 are turned ON and the bit lines 521 and 522 are precharged to the same potential by the precharge circuit 504. This potential may be, for example, VDD/2. After the precharge, the precharge switches 533 and 534 are turned OFF. Subsequently, the word line decoder 502 operates to turn ON the transistors 505 and 506. Then, the plate line decoder 503 operates to apply a high potential (VDD) to the plate line 527.

Since potentials of the terminals of the ferroelectric capacitors 513 and 514 on the side connected to the plate line 527 rise, potentials of the bit lines 521 and 522 rise via the transistors 505 and 506 as well. However, potentials to rise are different between the bit lines 521 and 522 since the polarization amount stored in the ferroelectric capacitors are different. The difference of the voltage is amplified by the sense amplifier 529 and can be outputted to the output terminal 543 via the sense amplifier selecting switch 531.

By applying opposite voltages to the input terminals 541 and 542 when writing, a potential of "0" can be written. Reading is performed in the same manner as described above. In this manner, the FeRAM operates.

Figure 12A:
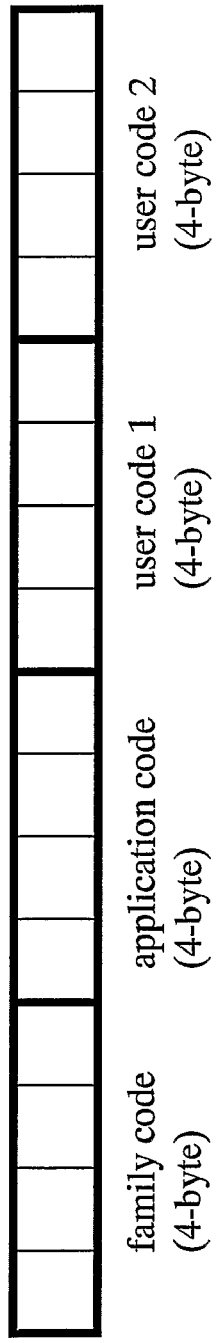
FIGS. 12A and 12B are diagrams showing examples of data stored in a memory circuit.
Figure 12B:
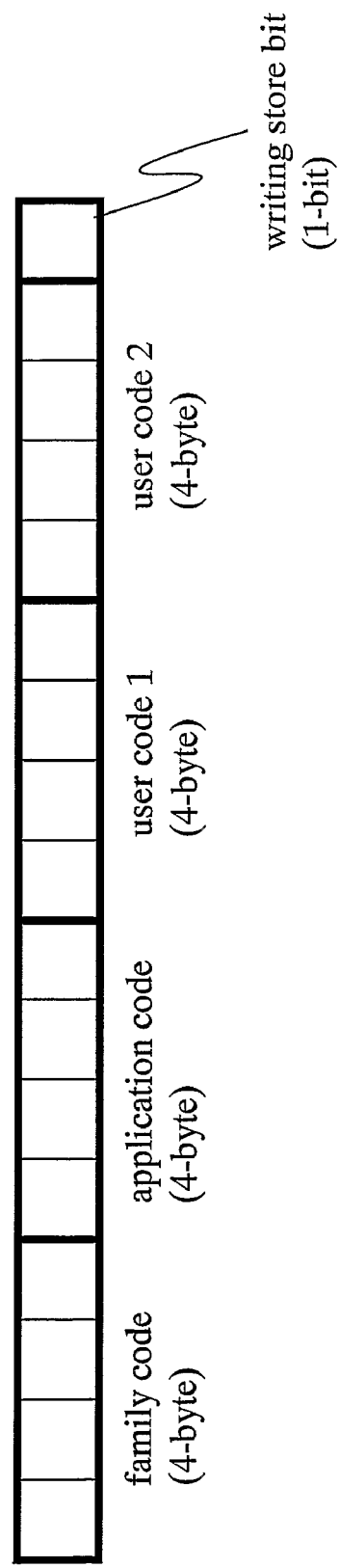

Now, an embodiment mode that data is written only once is described. In this embodiment mode, as shown in FIG. 12B, a bit representative of written state is additionally provided after a memory area (16-byte in FIG. 12B) that the memory circuit originally requires. This bit stores data representative of whether data is written or not.

Figure 13:
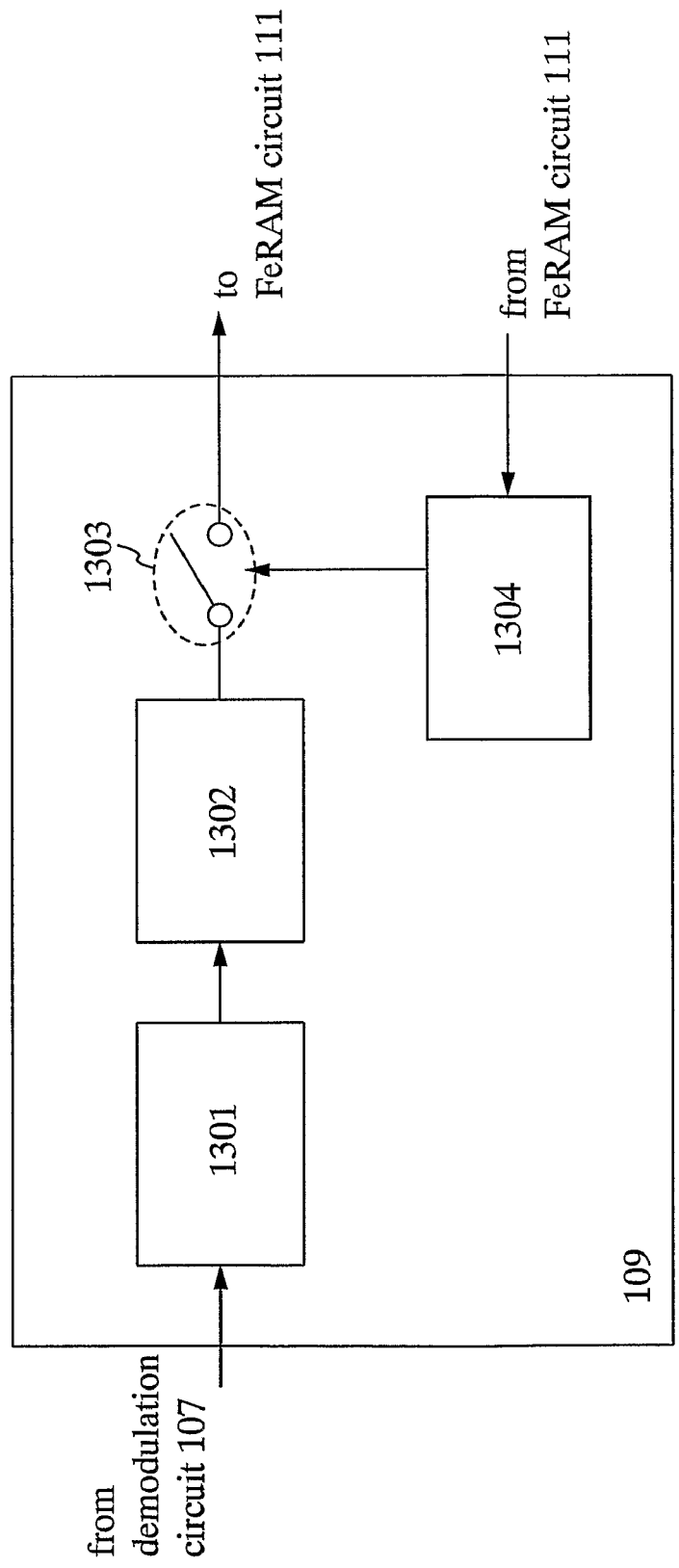
FIG. 13 is a block diagram showing the logic circuit of the invention.

The operation thereof is described with reference to FIG. 13. FIG. 13 shows an internal block of the logic circuit 109. The logic circuit 109 is constituted by a decode circuit 1301, a delay circuit 1302, a switch 1303, and a volatile memory circuit 1304. In the initial state, the writing store bit shown in FIG. 12B represents the state that data is not written, which is referred to as "0" is stored here ("0" is stored here, but "1" may be stored as well). When a signal is inputted from the antenna circuit and the stabilizing power source operates, the FeRAM circuit 111 outputs this value to the volatile memory circuit 1304 in the logic circuit 109. Then, the volatile memory circuit stores this value. This volatile memory circuit 1304 may have any configuration such as a DRAM, an SRAM, and a register as long as data can be stored.

Meanwhile, a signal inputted from the demodulation circuit 107 is decoded in the decode circuit 1301 and inputted to the switch 1303 via the delay circuit 1302. The switch 1303 is controlled by the volatile memory circuit 1304 and turns ON the switch 1303 when the data of the volatile memory circuit 1304 is "0" as described above. When the switch 1303 is ON, the signal is outputted to the FeRAM circuit 111 to be written. After the writing, the writing store bit shown in FIG. 12B stores "1" ("0" is stored when the initial value is "1"). The delay circuit 1302 is provided so that data is not outputted to the FeRAM circuit via the switch 1303 before the stabilizing power source operates and the state of the switch 1303 is determined. The malfunction before determining the switch may be prevented by using other means than the delay circuit as well.

When data of "1" is stored in the writing store bit shown in FIG. 12B, the volatile memory circuit 1304 operates to turn OFF the switch 1303. In this manner, data written at a second time or later cannot pass the switch 1303, therefore, data writing to the FeRAM circuit is limited only once.

Figure 9:
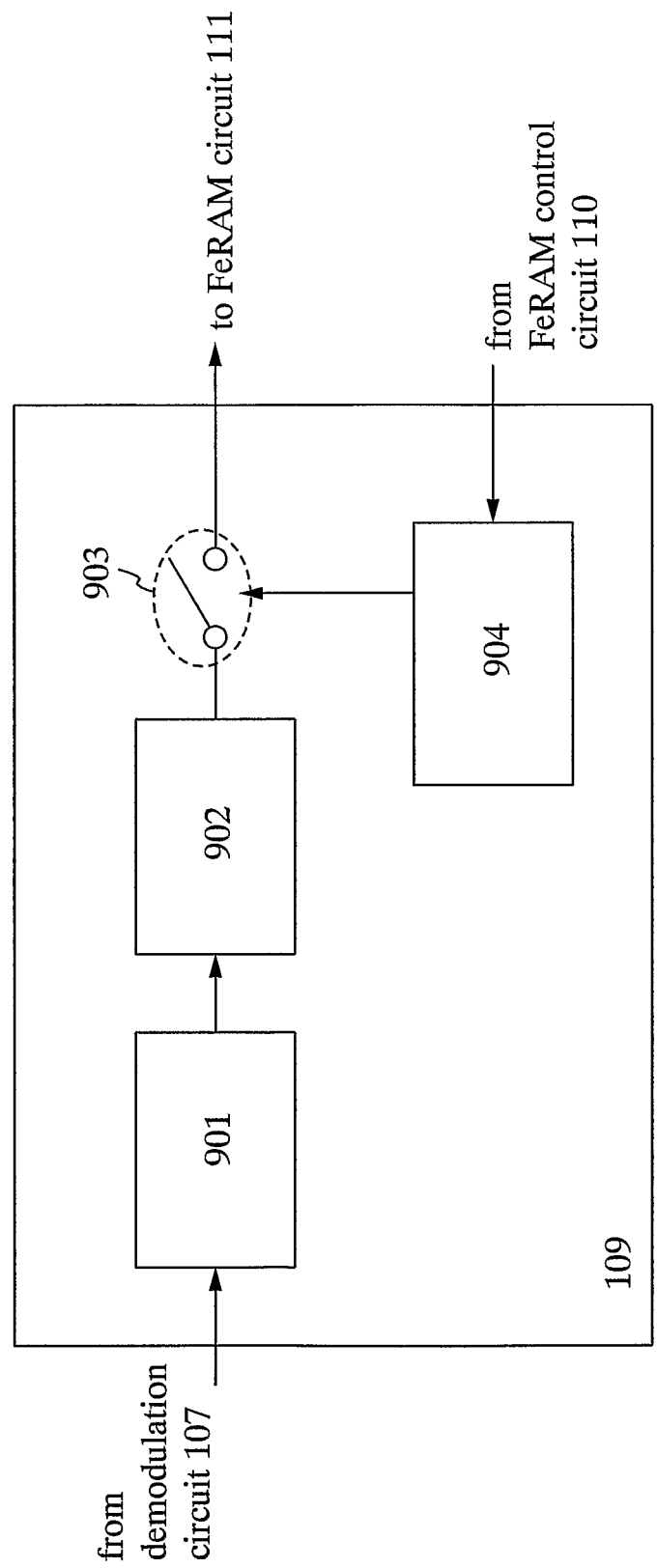
FIG. 9 is a block diagram showing the logic circuit of the invention.

An embodiment mode for writing once is described with reference to FIG. 9, which is different than FIG. 13. FIG. 9 shows an internal block of the logic circuit 109. The logic circuit 109 is constituted by a decode circuit 901, a delay circuit 902, a switch 903, and 1-bit FeRAM circuit 904. The writing store bit shown in FIG. 12B is stored in the 1-bit FeRAM 904 and represents in the initial state that data is not written, which is referred to as "0" is stored here ("0" is stored here, but "1" may be stored as well).

When a signal is inputted from the antenna circuit and the stabilizing power source operates, the signal inputted from the demodulation circuit 107 through the antenna circuit is decoded in the decode circuit 901 and inputted to the switch 903 via the delay circuit 902. The switch 903 is controlled by the 1-bit FeRAM circuit 904 and turns ON the switch 903 when the data of the 1-bit FeRAM circuit 904 is "0" as described above. When the switch 903 is ON, the signal is outputted to the FeRAM circuit 111 to be written. After the writing, the writing store bit (in the 1-bit FeRAM circuit 904) shown in FIG. 12B stores "1" ("0" is stored when the initial value is "1"). The delay circuit 902 is provided so that data is not outputted to the FeRAM circuit via the switch 903 before the stabilizing power source operates and the state of the switch 903 is determined. The malfunction before determining the switch may be prevented by using other means than the delay circuit as well.

When data of "1" is stored in the writing store bit shown in FIG. 12B, the 1-bit FeRAM circuit 904 operates to turn OFF the switch 903. In this manner, data written at a second time or later cannot pass the switch 903, therefore, data writing to the FeRAM circuit 111 is limited only once.

As described above, data can be written and read at a high speed and the reliability can be improved by using a FeRAM. Moreover, by providing a control circuit that allows data to be written to the memory circuit only once, data can be written to the memory circuit in an ID chip only once. In this manner, data forgery of the ID chip can be prevented and an ID chip with ensured security can be provided.

Embodiment 1

Figure 7:
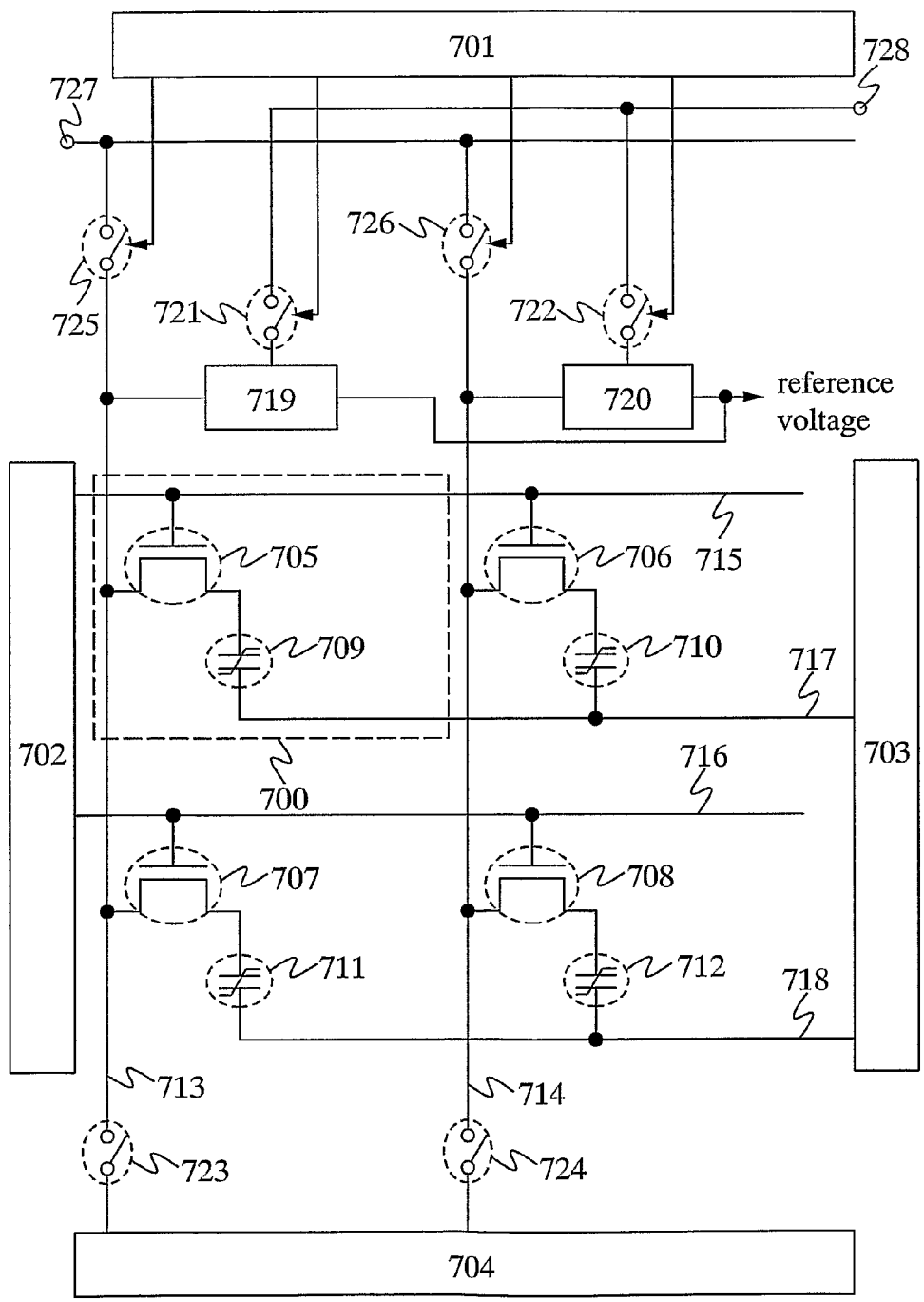
FIG. 7 shows a circuit configuration of a FeRAM having a 1T1C method.

Now, an operation of a FeRAM circuit that is different than the embodiment mode is described with reference to FIG. 7. In FIG. 7, the FeRAM circuit is formed by a 1T1C method (a method that one memory cell is constituted by one transistor and one ferroelectric capacitor). The FeRAM circuit in FIG. 7 employs a 4-bit memory circuit for simplifying the description, however, the invention is not limited to 4-bit. The FeRAM circuit shown in FIG. 7 includes a bit line decoder 701, a word line decoder 702, a plate line decoder 703, a precharge circuit 704, N-channel memory transistors 705 to 708 (hereinafter sometimes abbreviated as transistors 705 to 708), ferroelectric capacitors 709 to 712, bit lines 713 and 714, word lines 715 and 716, plate lines 717 and 718, sense amplifiers 719 and 720, sense amplifier selecting switches 721 and 722, precharge switches 723 and 724, bit line selecting switches 725 and 726, an input terminal 727, and an output terminal 728.

Now, description is made on a memory cell 700 constituted by a transistor 705 as a representative.

First, data is written so that the memory cell 700 outputs "1". A high potential (for example, VDD) is applied to the input terminal 727. Next, the bit line decoder 701 operates and the bit line selecting switch 725 is turned ON. Accordingly, a high potential is applied to the bit line 713. At this time, the plate line 717 has an intermediate potential (for example, VDD/2). Next, the word line decoder 702 operates to select the word line 715. Accordingly, the transistors 705 and 706 are turned ON and the bit line 713 and the ferroelectric capacitor 709 are short-circuited. Therefore, a voltage of VDD/2 is applied to the ferroelectric capacitor 709.

The aforementioned state corresponds to the point B in FIG. 8. Next, the same potential as the plate line 717 (here, VDD/2) is applied to the input terminal 727. Since the transistors 705 and 706 remain ON, a voltage applied between the terminals of the ferroelectric capacitor 709 is "0". Accordingly, the state of the ferroelectric capacitor 709 corresponds to the point C in FIG. 8. Then, the word line decoder 702 operates and the transistors 705 and 706 are turned OFF. In this manner, data is stored in the memory cell 700.

When reading data in the memory cell 700, the bit line selecting switch 725 is turned OFF and the input terminal 727 and the bit line 713 are cut off. Next, the precharge switch 723 is turned ON and the bit line 713 is precharged to VDD/2 by the precharge circuit 704. After the precharge, the precharge switch 723 is turned OFF. Next, the word line decoder 702 operates and the transistors 705 and 706 are turned ON. Then, the plate line decoder 703 operates and a high potential (VDD) is applied to the plate line 717.

Since a potential of the terminal of the ferroelectric capacitor 709 on the side connected to the plate line 717 rises, a potential of the bit line 713 rises via the transistor 705 as well. However, potential to rise is different since the polarizing amount stored in the ferroelectric capacitor is different. The difference between a reference voltage and the bit line voltage is amplified by the sense amplifier 719 and can be outputted to the output terminal 728 via the sense amplifier selecting switch 721.

By applying an opposite voltage to the input terminal 727 when writing, a potential of "0" can be written. Reading is performed in the same manner as described above. In this manner, the FeRAM of this embodiment operates.

Embodiment 2

Figure 20:
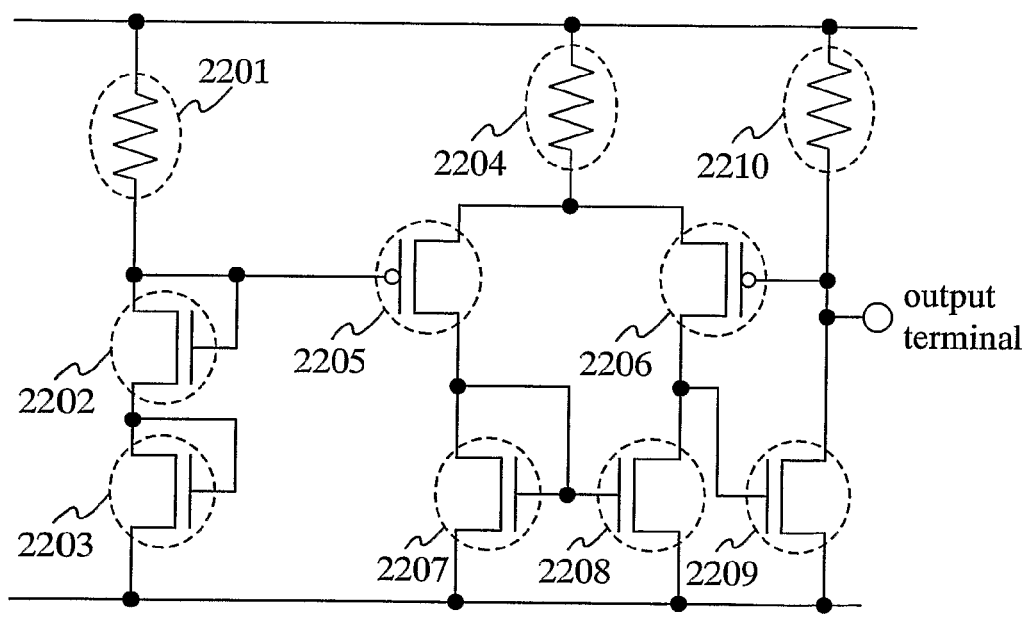
FIG. 20 is a diagram showing an example of the stabilizing power source circuit of the invention.

An example of the stabilizing power source circuit is described with reference to FIG. 20. The stabilizing power source circuit is constituted by a reference voltage circuit and a buffer amplifier, The reference voltage circuit includes a resistor 2201 and diode connected transistors 2202 and 2203, and generates a reference voltage as high as two VGSs. The buffer amplifier is constituted by a differential circuit constituted by transistors 2205 and 2206, a current mirror circuit constituted by transistors 2207 and 2208, and a common source amplifier constituted by a current supply resistor 2204, a transistor 2209, and a resistor 2210.

When a large current flows from the output terminal, less current flows to the transistor 2209 while when a small current flows from the output terminal, more current flows to the transistor 2209 so that almost constant current flows to the resistor 2210. Moreover, a potential of the output terminal has almost the same value as that of the reference voltage circuit. Here, the stabilizing power source circuit constituted by the reference voltage circuit and the buffer amplifier is described, however, circuits having other configurations may be employed for the stabilizing power source circuit of the invention.

Embodiment 3

A method for manufacturing TFTs used for the memory element and the logic circuit portion such as a decoder over the insulating substrate at the same time described in the embodiment mode is described with reference to FIGS. 14A to 14C, 15A to 15C, 16A to 16C, 17A and 17B. In this embodiment, a capacitor using a ferroelectric material and an N-channel TFT and a P-channel TFT as semiconductor elements are taken as examples, however, the semiconductor elements included in the memory portion and the logic circuit portion are not limited to these. Moreover, this manufacturing method is only an example and does not limit a manufacturing method of TFTs over an insulating substrate.

Figure 14A:
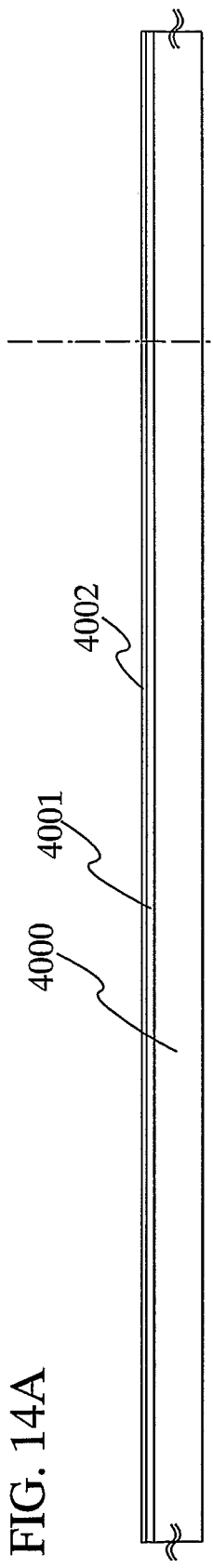
FIGS. 14A to 14C are sectional diagrams showing the manufacturing steps of the invention.

In FIG. 14A, a substrate 4000 may be a glass substrate formed of barium borosilicate glass, aluminoborosilicate glass and the like, a quartz substrate, a stainless substrate and the like. Further, a substrate formed of flexible synthetic resin such as plastic, though the heat resistant temperature is low as compared to the aforementioned substrate, can be used as long as it can resist the processing temperature in the manufacturing steps.

Base films 4001 and 4002 each formed of an insulating film such as a silicon oxide film, a silicon nitride film, or a silicon oxynitride film are formed over the substrate 4000. For example, a silicon oxynitride film formed of $SiH_4$, $NH_3$, and $N_2O$ formed in thickness of 10 to 200 nm (preferably 50 to 100 nm) by plasma CVD as the base film 4001 and a hydrogenated silicon oxynitride film formed of $SiH_4$ and $N_2O$ formed in thickness of 50 to 200 nm (preferably 100 to 150 nm) as the base film 4002 are stacked. In this embodiment, the base film are provided in two-layer structure, however, a single film or a stacked structure of two or more layers of the insulating film may be employed as well. Moreover, when impurities are unlikely to be dispersed such as the case of using a quartz substrate, the base film is not necessarily formed.

Figure 14B:
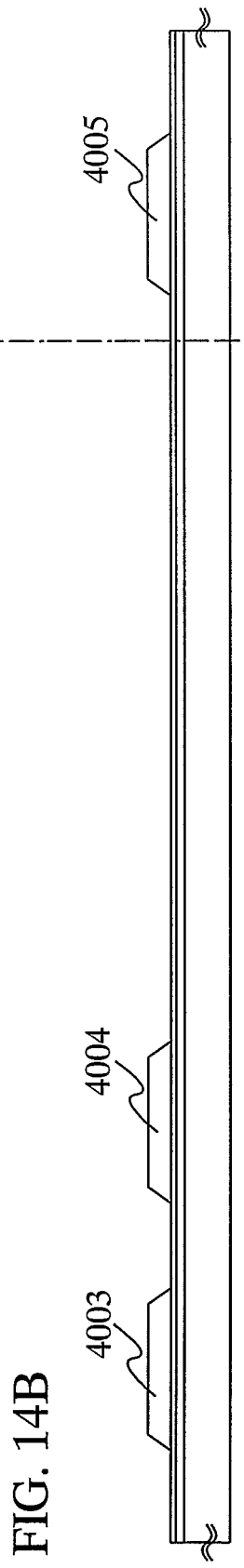

Island-shaped semiconductor layers 4003 to 4005 are formed of crystalline semiconductor films obtained by crystallizing an amorphous semiconductor film by laser or a known thermal crystallization method (FIG. 14B). The island-shaped semiconductor layers 4003 to 4005 are formed in thickness of 25 to 100 nm (preferably 30 to 60 nm). The island-shaped semiconductor layers 4003 to 4005 may be formed of amorphous semiconductors or polycrystalline semiconductors. For the semiconductor, silicon germanium as well as silicon can be used. When using silicon germanium, it is preferable that the concentration thereof contain germanium at a concentration of about 0.01 to 4.5 atomic %.

When forming a crystalline semiconductor film by laser crystallization, a pulse oscillation or a continuous oscillation excimer laser, a YAG laser, or a $YVO_4$ laser is used. When using these lasers, it is appropriate to use a method in which laser light emitted from a laser oscillator is converged into a linear shape by an optical system, and is irradiated onto the semiconductor film. Although the conditions of the crystallization should be properly selected by an operator, in the case where the excimer laser is used, a pulse oscillation frequency is set to 30 Hz, and a laser energy density is set to 100 to 400 $mJ/cm^2$ (typically 200 to 300 $mJ/cm^2$). Further, in the case where the YAG laser is used, it is appropriate that the second harmonic wave is used to set a pulse oscillation frequency to 1 to 10 kHz, and a laser energy density to 300 to 600 $mJ/cm^2$ (typically, 350 to 500 $mJ/cm^2$). Then, laser light converged into a linear shape with a width of 100 to 1000 μm, for example, 400 μm is irradiated to the entire surface of the substrate, and an overlapping ratio (overlap ratio) of the linear laser light at this time may be set to 80 to 98%.

Figure 14C:
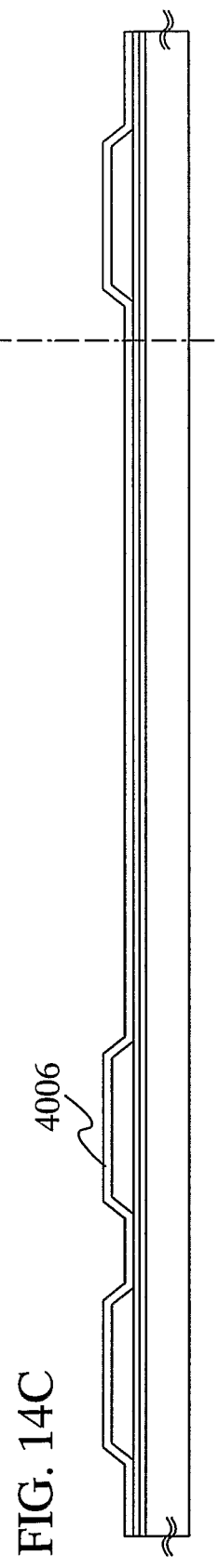

Subsequently, a gate insulating film 4006 covering the island-shaped semiconductor layers 4003 to 4005 is formed (FIG. 14C). The gate insulating film 4006 is formed of an insulating film containing silicon in thickness of 40 to 150 nm by plasma CVD or sputtering, which is formed of a silicon oxynitride film in thickness of 120 nm in this embodiment. It is needless to say that the gate insulating film 4006 is not limited to such a silicon oxynitride film, but may be a single layer or a stacked-layer structure of other insulating films containing silicon. A silicon oxide film, for example, can be formed using a mixed gas such as TEOS (Tetraethyl Ortho Silicate) and $O_2$ by discharging by plasma CVD at a reaction pressure of 40 Pa, a substrate temperature of 300 to 400° C., a high frequency (13.56 MHz), and a power density of 0.5 to 0.8 $W/cm^2$. The silicon oxide film formed in this manner is then subject to thermal annealing at 400 to 500° C., thus favorable characteristics as an insulating film can be obtained.

Subsequently, gate electrodes 4100 to 4102 are formed on the gate insulating film 4006 as shown in FIG. 15A. The gate electrodes 4100 to 4102 may be formed of tantalum (Ta), titanium (Ti), molybdenum (Mo), tungsten (W), an alloy containing the aforementioned element as a main component, or polycrystalline silicon. First, a conductive layer is formed on the surface of the gate insulating film 4006 and etched by using a resist mask (not shown), thereby the gate electrodes 4100 to 4102 are formed.

After that, impurity elements imparting N-type conductivity are doped. In this manner, low concentration N-type impurity regions 4103 to 4108 are formed in a semiconductor active layer.

Subsequently, a resist mask (not shown) is formed so as to cover the gate electrode 4102. N-type impurity elements are doped in a self-aligned manner with the gate electrode 4101 and the resist mask used as masks. Moreover, P-type impurity elements are doped in a self-aligned manner with the gate electrode 4101 used as a mask.

In this manner, high concentration N-type impurity regions 4111, 4112, 4113, and 4114 functioning as a source region or a drain region of the N-channel TFT, and high concentration P-type impurity regions 4109 and 4110 functioning as a source region or a drain region of the P-channel TFT are formed. For the impurity elements imparting N-type conductivity, phosphorus (P) or arsenic (As) are used while boron (B) is used for the impurity elements imparting P-type conductivity.

After that, the N-type and P-type impurity elements are activated. For activation, furnace annealing, laser annealing, lamp annealing, or a method combining the aforementioned is preferably used. Thermal annealing is performed in a nitrogen atmosphere containing oxygen concentration of 1 ppm or less, or preferably 0.1 ppm or less at a temperature of 400 to 700° C.

Then, as shown in FIG. 15C, a first interlayer insulating film 4115 formed of a silicon nitride film or a silicon oxynitride film is formed on the gate electrodes 4100 to 4102.

In this manner, a switching TFT that constitutes a pixel portion and a TFT that constitutes a driver circuit or other logic circuits are formed over the same substrate. Next, a capacitor using a ferroelectric material is formed on the first interlayer insulating film 4115.

Figure 16A:
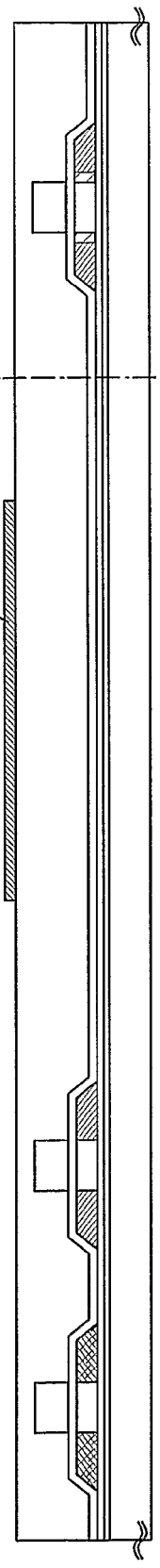
FIGS. 16A to 16C are sectional diagrams showing the manufacturing steps of the invention.

First, a bottom electrode layer 4201 is formed (FIG. 16A). It may be formed by a method selected from a CVD method, a sputtering method, an ion beam sputtering method, a laser ablation method, and the like. The bottom electrode layer 4201 may be formed of a material such as Pt/IrO$_2$, Pt/Ta/SiO$_2$. Since the electronic characteristics of the ferroelectric thin film heavily depend on the orientation of crystals, it is preferable to use Pt for the surface of the bottom electrode that can be easily controlled in orientation. After forming the metal film, unnecessary portions are removed by plasma etching to form the bottom electrode layer 4201.

Figure 16B:

Subsequently, a ferroelectric layer 4202 is formed on the bottom electrode layer 4201 (FIG. 16B). The ferroelectric may be lead-based perovskite such as PZT and PbTiO$_3$, bismuth layer compound such as Bi$_4$Ti$_3$O$_{12}$, or ilmenite-based compound such as LiNbO$_3$ and LiTaO$_3$. A ferroelectric using lead-based perovskite, PZT inter alia, is preferable since it exhibits the property of ferroelectric in a wide composition range.

The ferroelectric layer 4202 may be formed by a method selected from a CVD method, a sputtering method, an ion beam sputtering method, a laser ablation method and the like. CVD method inter alia, is particularly preferable since it is superior in controllability of film composition and crystallinity, which is favorable for forming in a large area and in a large quantity. In the case of forming by a CVD method, a material having such conditions that it has a large evaporation pressure at a relatively low temperature, it is stable over a long time, a precipitation speed thereof is determined depending on the supplied amount of a source material within the range of deposition temperature, a nucleation reaction does not occur in vapor phase, and the like is preferably used. PZT is superior in these respects as well.

A ferroelectric layer may be formed by CVD according to a known process. For example, a ferroelectric layer formed of PZT can be formed with a pressure of 660 Pa and at a substrate temperature of 500 to 650° C.

Figure 16C:
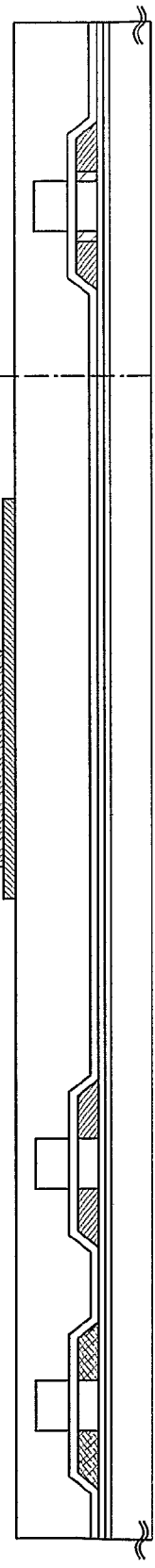

Subsequently, a top electrode layer 4203 is formed on the ferroelectric layer 4202 by a method selected from a CVD method, a sputtering method, an ion beam sputtering method, a laser ablation method and the like similarly to the bottom electrode layer 4201 (FIG. 16C). The top electrode layer 4203 can be formed of Ir/IrO$_2$ and the like as well as a material used for the bottom electrode layer 4201.

Next, as shown in FIG. 17A, after forming a second interlayer insulating film 4307 formed of a silicon nitride film or a silicon oxynitride film, contact holes are formed and wirings 4300 to 4306 are formed through the contact holes. The electrical connection between the wirings 4300 to 4306 and the TFTs are not limited to those described in this embodiment.

At last, as shown in FIG. 17B, a protective layer 4308 is formed on the second interlayer insulating film 4307. The protective layer 4308 can be formed of a light curable or heat curable organic resin material such as polyimide and acrylic resin.

Through the aforementioned procedure, TFTs that form a pixel portion, TFTs that form a driver circuit and other logic circuits, and a capacitor using a ferroelectric material that forms a nonvolatile latch circuit can be formed over the same substrate at the same time.

In this embodiment, the switching TFT that forms the pixel has a structure including an LDD region that is not overlapped with a gate electrode and the TFTs that form the driver circuit and the logic circuit have single drain structures, however, the invention is not limited to these structures. A TFT structure suitable for an application such as a GOLD structure and other LDD structures is to be manufactured according to a known method.

Embodiment 4

Figure 21A:
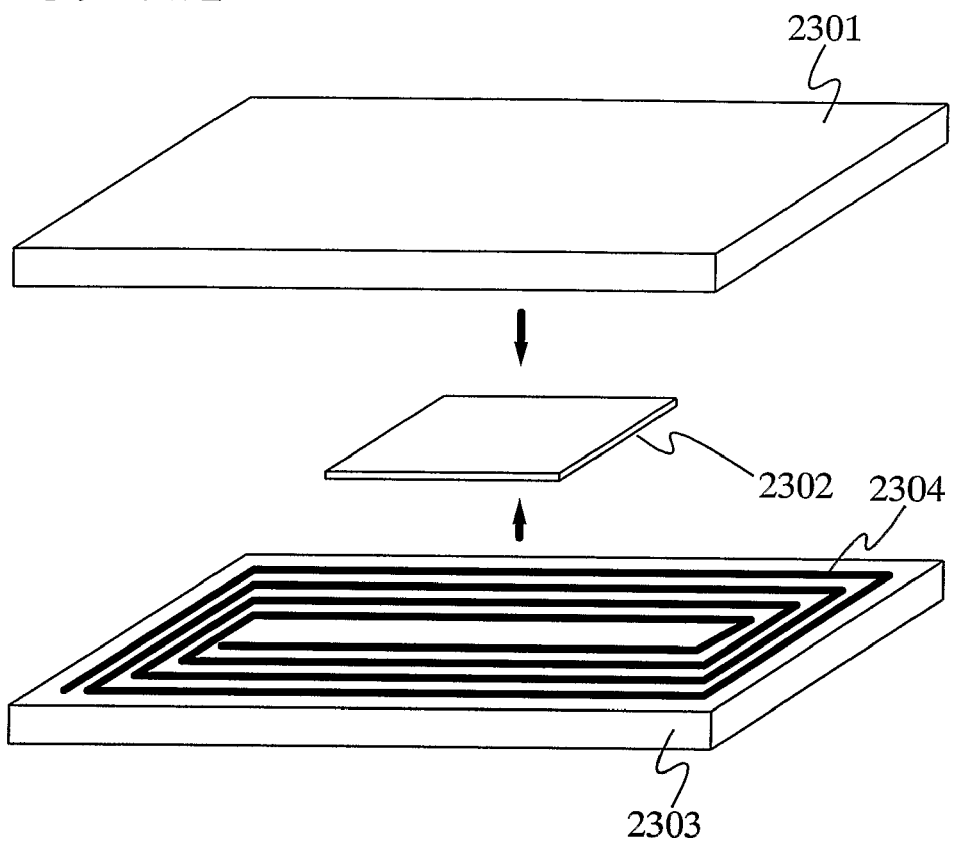
FIGS. 21A and 21B are views showing a combination of a protective layer and the semiconductor device of the invention.

An example of forming a flexible ID tag using a peeling process is described with reference to FIGS. 21A and 21B. An ID tag includes flexible protective layers 2301 and 2303 (hereinafter sometimes abbreviated as protective layers 2301 and 2303), and an ID chip 2302 formed by a peeling process. In this embodiment, an antenna 2304 is not formed over the ID chip 2302 but formed over the protective layer 2303 and connected to the ID chip 2302 electrically. In FIG. 21A, the antenna 2304 is formed only over the protective layer 2303, however, it may be formed over the protective layer 2301 as well. The antenna is preferably formed of silver, copper, or metal plated by these. The ID chip 2302 and the antenna 2304 are connected by an anisotropic conductive film by UV process, however, they may be connected by other methods as well.

Figure 21B:
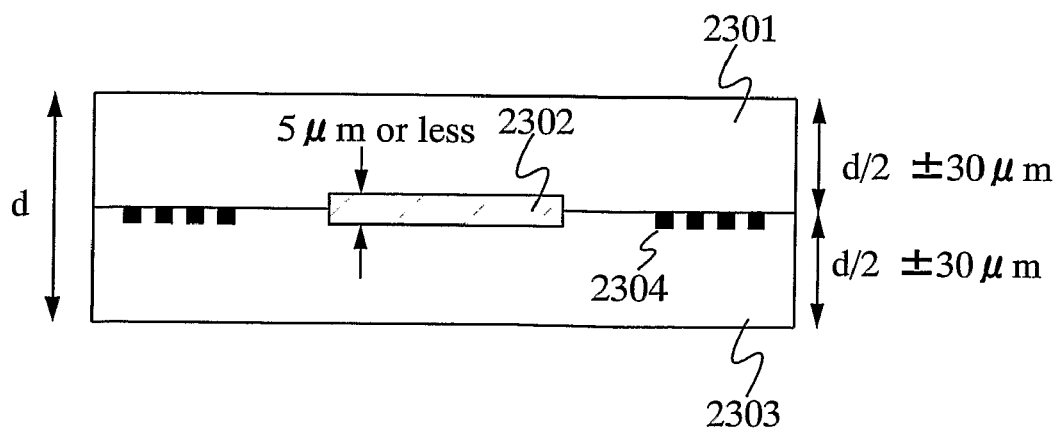

FIG. 21B shows a sectional view of FIG. 21A. The ID chip 2302 has a thickness of 5 μm or less, preferably 0.1 to 3 μm. When the thickness of the protective layers 2301 and 2303 when stacked together is d, it is preferable that (d/2)±30 μm, and most preferably (d/2)±10 μm be a thickness of the protective layer 2301 and the protective layer 2303. It is preferable that the protective layers 2301 and 2303 have thickness of 10 to 200 μm. The ID chip 2302 has an area of 5 mm square or less and preferably 0.3 to 4 mm square.

The protective layers 2301 and 2303 are formed of an organic resin material and have structures that are resistant to bending. Since the ID chip 2302 formed by using the peeling process is also resistant to bending as compared to a single crystalline semiconductor, it can be closely contact with the protective layers 2301 and 2303. Such an ID chip sandwiched by the protective layers 2301 and 2303 may be disposed on the surface of or inside other objects, or may be incorporated in paper.

Embodiment 5

Figure 19:
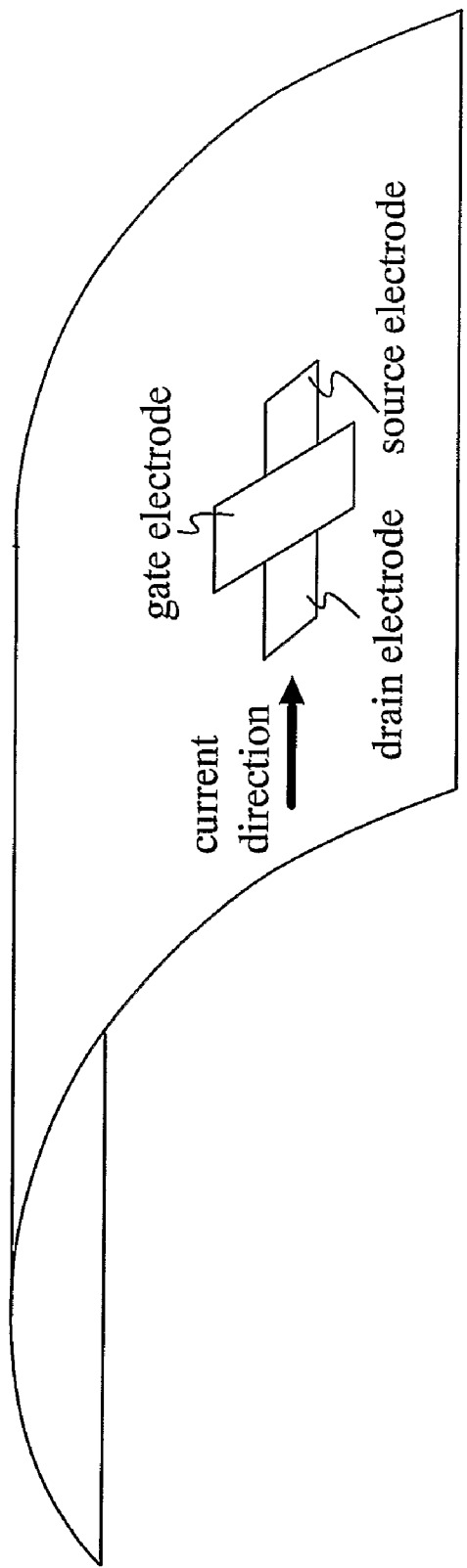
FIG. 19 is a view showing an arrangement of the TFT according to the invention.

Hereinafter described with reference to FIG. 19 is the case of sticking an ID chip to a curved surface, that is, the case of disposing TFTs perpendicularly to the direction of the arc of the ID chip. In each of the TFTs included in the ID chip in FIG. 19, a drain electrode, a gate electrode, and a source electrode through which a current flows are aligned so as to be affected less by stress. With such an arrangement, variations in TFT characteristics can be suppressed. The crystals that form a TFT are aligned in a direction of current flow. By forming these crystals by CWLC and the like, S value can be 0.35 V/dec or less (preferably 0.09 to 0.25 V/dec), and mobility can be 100 cm$^2$/Vs or more.

If a 19-stage ring oscillator is formed by using these TFTs, its oscillation frequency can be 1 MHz or more, preferably 100 MHz or more with a power source voltage of 3 to 5 V. With the power source voltage of 3 to 5 V, a delay time per one stage of inverter is 26 ns, preferably 0.26 ns or less.

In order not to break active elements such as a TFT by the stress, it is preferable that active regions (silicon island portions) of the active elements such as a TFT occupy 5 to 50% of the entire area.

A base insulating material, an interlayer insulating material, and a wiring material are mainly provided in a region where the active elements such as a TFT are not provided. It is preferable that the area other than the active regions of the TFTs be 60% or more of the entire area.

The active regions of the active element preferably have thickness of 20 to 200 nm, typically 40 to 170 nm. Moreover, it is preferable to form the active regions in thickness of 45 to 55 nm when forming large active regions and it is preferable to form the active regions in thickness of 145 to 155 nm when forming small active regions.

Embodiment 6

In this embodiment, an example of providing an external antenna for a circuit using the invention is described with reference to FIGS. 10A to 10E and 11A to 11C.

Figure 10A:
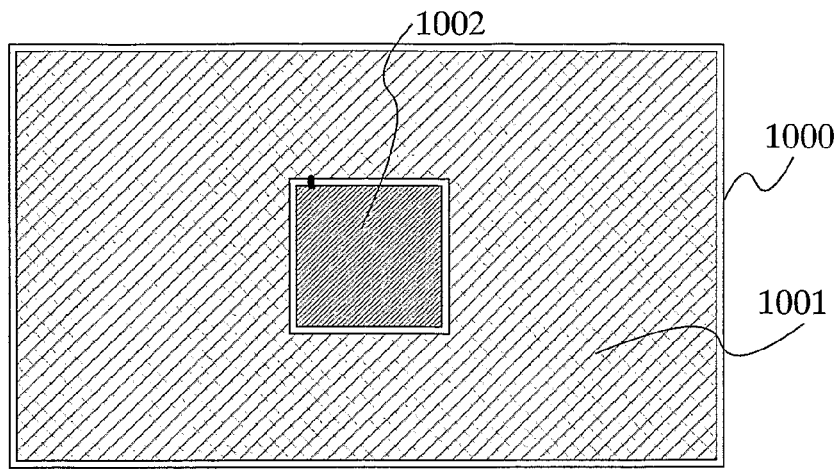
FIGS. 10A to 10E are diagrams showing embodiments of the antenna of the invention.

In FIG. 10A, the periphery of the circuit is covered with a sheet of antenna. An antenna 1001 is formed over a substrate 1000 and connected to a circuit 1002 using the invention. Although the antenna 1001 covers the periphery of the circuit 1002 in FIG. 10A, the antenna 1001 may cover the entire surface of the substrate and the circuit 1002 in which electrodes are formed may be stuck thereto.

Figure 10B:
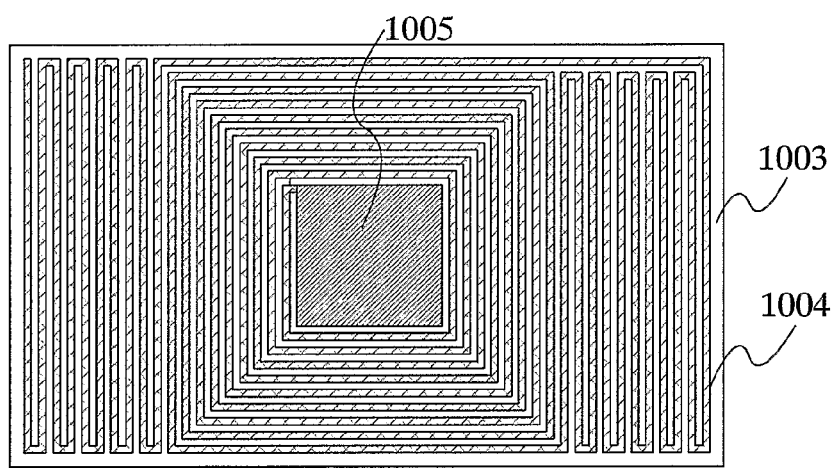

In FIG. 10B, a thin antenna is provided so as to travel around the circuit. An antenna 1004 is formed over a substrate 1003 and connected to a circuit 1005 using the invention. Note that the arrangement of a wiring of the antenna described here is only an example and the invention is not limited to this.

Figure 10C:
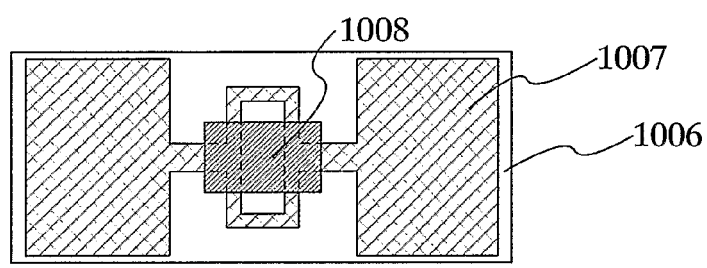

FIG. 10C shows one of the shapes of an antenna for receiving electromagnetic waves of high frequency. An antenna 1007 is formed over a substrate 1006 and connected to a circuit 1008 using the invention.

Figure 10D:
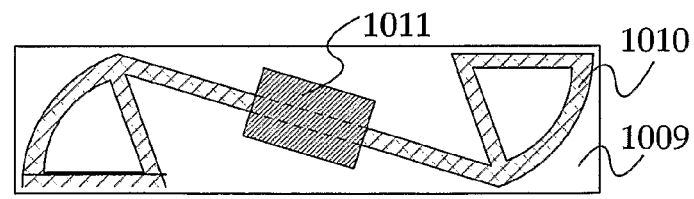

FIG. 10D shows a 180° omnidirectional antenna (capable of receiving electric waves from any direction). An antenna 1010 is formed over a substrate 1009, and a circuit 1011 using the invention is connected thereto.

Figure 10E:
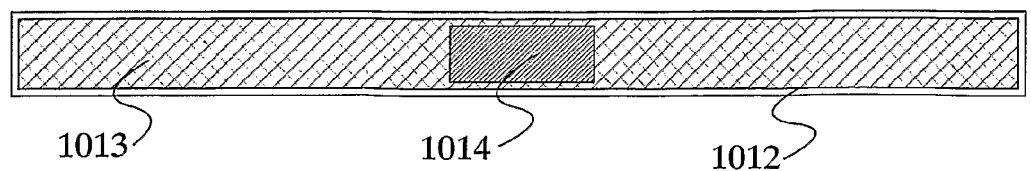

FIG. 10E shows an antenna formed in a stick shape. An antenna 1013 is formed over a substrate 1012, and a circuit 1014 using the invention is connected thereto.

The circuit using the invention can be connected to such an antenna by a known method. For example, the circuit and the antenna may be connected by wire bonding or bump bonding. Alternatively, the surface of the circuit formed as a chip may be used as an electrode to be attached to the antenna In the latter case, the circuit can be attached to the antenna by using an ACF (Anisotropic Conductive Film).

An appropriate length of the antenna is different depending on the frequency used for reception. It is generally preferable that the antenna be as long as a wavelength divided by an integer. For example, if the frequency is 2.45 GHz, the antenna is preferably about 60 mm (half wavelength) or about 30 mm (quarter wavelength).

Figure 11A:
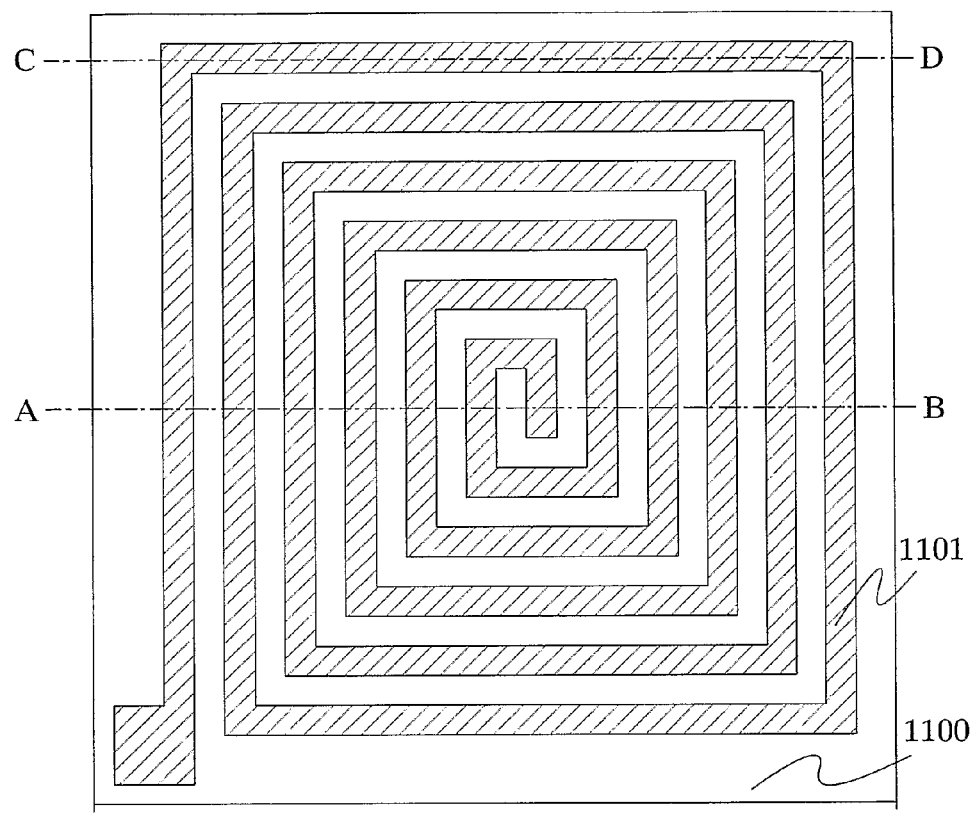
FIGS. 11A to 11C are diagrams showing embodiments of the antenna of the invention.
Figure 11B:
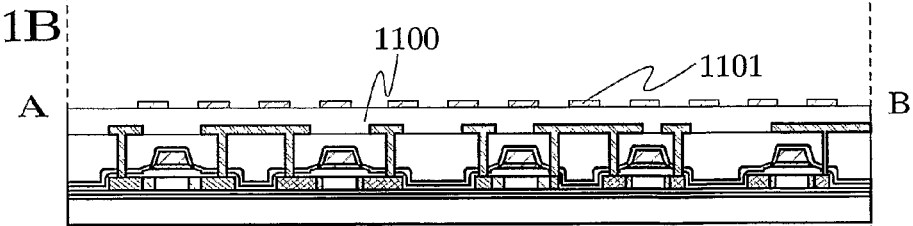
Figure 11C:
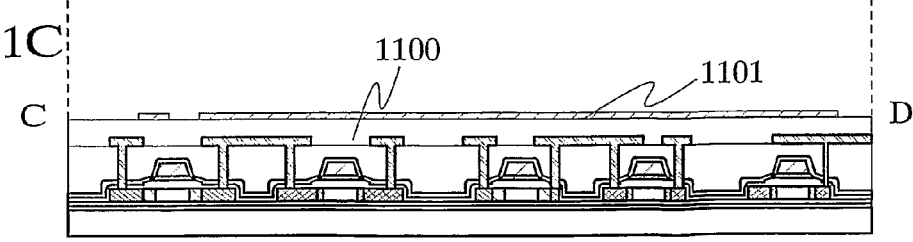

It is also possible to attach another substrate to the circuit of the invention and form an antenna thereover FIGS. 11A to 11C show a top plan view and sectional views of a circuit over which a substrate 1100 (a top substrate) is attached and a spiral antenna 1101 (an antenna wiring) is provided thereover.

Note that the antenna shown in this embodiment is just an example and the shape of the antenna is not limited to this. The invention can be implemented with any form of antenna. This embodiment can be implemented with combination with the embodiment mode and Embodiments 1 to 5.

Embodiment 7

In this embodiment, a method for manufacturing a thin film integrated circuit device including a TFT is described in detail with reference to FIGS. 22A to 24B. For simplicity, the manufacturing method is described herein by showing a cross sectional structure of a CPU and a memory portion using an N-channel ITT and a P-channel TFT.

Figure 22A:
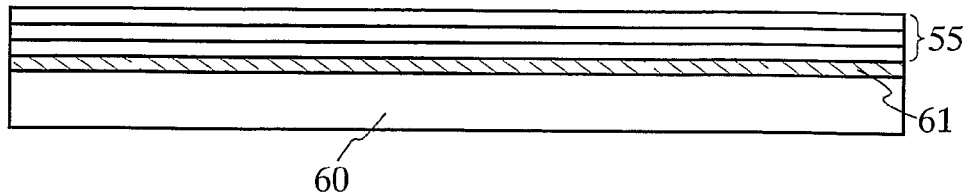
FIGS. 22A to 22E are sectional diagrams showing the manufacturing steps of the invention.

Fist, a peeling layer 61 is formed over a substrate 60 (FIG. 22A). The peeling layer 61 here is formed over a glass substrate (e.g., a 1737 substrate, product of Corning Incorporated) by low pressure CVD using an a-Si film (amorphous silicon film) with a thickness of 50 nm (500 Å). As for the substrate 60, a quartz substrate, a substrate made of an insulating material such as alumina, a silicon wafer substrate, a plastic substrate having enough heat resistance to the processing temperature in the subsequent step, and the like may be employed as well as the glass substrate.

The peeling layer 61 is preferably formed of a film mainly containing silicon such as polycrystalline silicon, single crystalline silicon and SAS (semi-amorphous silicon that is also referred to as microcrystalline silicon) as well as amorphous silicon, though the invention is not limited to these. The peeling layer 61 may be formed by plasma CVD or sputtering as well as low pressure CVD. A film doped with an impurity such as phosphorous may be employed as well. The thickness of the peeling layer 61 is desirably 50 to 60 nm, though it may be 30 to 50 nm in the case of employing an SAS.

Next, a protective film 55 (also referred to as a base film or a base insulating film) is formed over the peeling layer 61 (FIG. 22A). Here, the protective film 55 is constituted by three layers of a SiON (silicon oxynitride: silicon oxide containing nitrogen) film with a thickness of 100 nm, a SiNO (silicon nitride oxide: silicon nitride containing oxygen) film with a thickness of 50 nm, and a SiON film with a thickness of 100 nm in this order, though the material, the thickness, and the number of layers are not limited to these. For example, instead of the SiON film on the bottom layer, a heat resistant resin such as siloxane with a thickness of 0.5 to 3 μm may be formed by spin coating, slit coating, droplet discharging, or the like. Alternatively, a silicon nitride film (SiN, Si$_3$N$_4$ or the like) may be employed. Instead of the SiON film on the top layer, a silicon oxide film may be employed. The respective thicknesses of the layers are preferably set to 0.05 to 3 μm and can be selected within this range as required.

A silicon oxide film can be formed by thermal CVD, plasma CVD, atmospheric pressure CVD, bias ECRCVD, or the like using a mixed gas such as SiH$_4$/O$_2$ and TEOS (tetraethoxy silane)/O$_2$. A silicon nitride film can be typically formed by plasma CVD using a mixed gas of SiH$_4$/NH$_3$. A SiON film or a SiNO film can be typically formed by plasma CVD using a mixed gas of SiH$_4$/N$_2$O.

Note that if a material mainly containing silicon such as a-Si is employed for the peeling layer 61 and an island-shaped semiconductor film 57, the protective film 55 that is in contact with them may be formed of $SiO_xN_y$ in view of the adhesiveness.

Subsequently, thin film transistors (TFTs) for constituting a CPU and a memory portion of a thin film integrated circuit device are formed over the protective film 55. Note that other thin film active elements such as organic TFTs and thin film diodes may be formed as well as the TFTs.

Figure 22B:
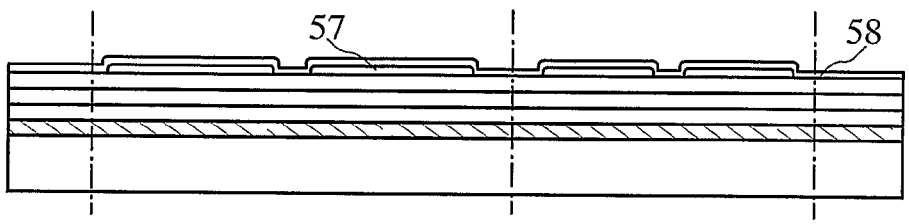

In order to form a TFT, first, the island-shaped semiconductor film 57 is formed over the protective film 55 (FIG. 22B). The island-shaped semiconductor film 57 is formed of an amorphous semiconductor, a crystalline semiconductor or a semi-amorphous semiconductor, which mainly contains silicon, silicon germanium (SiGe), or the like.

In this embodiment, an amorphous silicon film with a thickness of 70 nm is formed and the surface thereof is treated with a solution containing nickel. Thermal crystallization is performed at a temperature of 500 to 750° C. so that a crystalline silicon semiconductor film is obtained. Then, the crystallinity thereof is improved by laser crystallization. Note that the film may be formed by plasma CVD, sputtering, LPCVD, or the like. As a crystallizing method, laser crystallization, thermal crystallization, or thermal crystallization using a catalyst (Fe, Ru, Rh, Pd, Os, Ir, Pt, Cu, Au, or the like) may be adopted, or such methods may be performed alternately a plurality of times.

Alternatively, the amorphous semiconductor film may be crystallized by a continuous wave laser. In order to obtain a crystal with a large grain size during crystallization, a solid state laser capable of continuous wave may be used and it is preferable to apply second to fourth harmonics of a fundamental wave (the crystallization in this case is referred to as CWLC). Typically, a second harmonic (532 nm) or a third harmonic (355 nm) of an Nd: $YVO_4$ laser (a fundamental wave: 1064 nm) is applied. When a continuous wave laser is used, laser light emitted from a continuous wave $YVO_4$ laser of which output is 10 W is converted into a harmonic by a non-linear optical element. There is also a method for emitting a harmonic by putting a $YVO_4$ crystal or a $GdVO_4$ crystal and a non-linear optical element in a resonator. Then, the laser light is preferably formed in a rectangular shape or an ellipse shape at an irradiated surface with an optical system to irradiate a subject. In that case, the energy density of about 0.01 to 100 $MW/cm^2$ (preferably 0.1 to 10 $MW/cm^2$) is required. Then, the semiconductor film is preferably irradiated with laser light while being moved relatively to the laser light at a speed of about 10 to 2000 cm/sec.

When a pulsed laser is used, a pulsed laser having a frequency band of several tens to several hundreds Hz is generally used, though a pulsed laser having an extremely higher oscillation frequency of 10 MHz or more may be used as well (the crystallization in this case is referred to as MHzLC). It is said that it takes several tens to several hundreds nsec to solidify a semiconductor film completely after the semiconductor film is irradiated with the pulsed laser light. When the pulsed laser light has an oscillation frequency of 10 MHz or more, it is possible to irradiate the next pulsed laser light before the semiconductor film is solidified after it is melted by the previous laser light. Therefore, unlike the case of the conventional pulsed laser, the interface between the solid phase and the liquid phase can be moved continuously in the semiconductor film, and thus the semiconductor film having a crystal grain grown continuously along the scanning direction can be formed. Specifically, it is possible to form an aggregation of crystal grains each of which has a width of 10 to 30 μm in the scanning direction and a width of about 1 to 5 μm in the direction perpendicular to the scanning direction. By forming such single crystal grains extending long in the scanning direction, a semiconductor film having few grain boundaries at least in the channel direction of the TFT can be formed.

Note that when the protective film 55 is partially formed of siloxane that is a heat resistant organic resin, heat leak from the semiconductor film can be prevented in the aforementioned crystallization, leading to effective crystallization.

The crystalline silicon semiconductor film is obtained through the aforementioned steps. The crystals thereof are preferably aligned in the same direction as the source, channel and drain direction. The thickness of the crystalline layer thereof is preferably 20 to 200 nm (typically 40 to 170 nm, and more preferably 50 to 150 nm). Subsequently, an amorphous silicon film for gettering of a metal catalyst is formed over the semiconductor film with an oxide film interposed therebetween, and heat treatment is performed at a temperature of 500 to 750° C. for gettering. Furthermore, in order to control a threshold value as a TFT element, boron ions are injected into the crystalline silicon semiconductor film at a dosage of from $10^{13}/cm^2$ to less than $10^{14}/cm^2$. Then, etching is performed with a resist used as a mask to form the island-shaped semiconductor film 57.

Alternatively, the crystalline semiconductor film may be obtained by forming a polycrystalline semiconductor film directly by LPCVD (Low Pressure CVD) using a source gas of disilane ($Si_2H_6$) and germanium fluoride ($GeF_4$). The flow rate of the gas is such that $Si_2H_6/GeF_4=20/0.9$, the temperature for forming the film is 400 to 500° C., and He or Ar is used as a carrier gas, though the invention is not limited to these conditions.

A TFT, particularly the channel region thereof is preferably added with hydrogen or halogen of $1\times10^{19}$ to $1\times10^{22}$ $cm^{-3}$, and more preferably $1\times10^{19}$ to $5\times10^{20}$ $cm^{-3}$. In the case of an SAS, it is preferably added with hydrogen or halogen of $1\times10^{19}$ to $2\times10^{21}$ $cm^{-3}$. In either case, it is desirable that the amount of hydrogen or halogen be larger than that contained in single crystals used for an IC chip. According to this, local cracks that may be generated at the TFT portion can be terminated by hydrogen or halogen.

Then, a gate insulating film 58 is formed over the island-shaped semiconductor film 57 (FIG. 22B). The gate insulating film 58 is preferably formed of a single layer or stacked layers of a film containing silicon nitride, silicon oxide, silicon nitride oxide, or silicon oxynitride by a thin film forming method such as plasma CVD and sputtering. In the case of the stacked layers, a three-layer structure may be adopted for example, where a silicon oxide film, a silicon nitride film and a silicon oxide film are stacked in this order over the substrate.

Figure 22C:
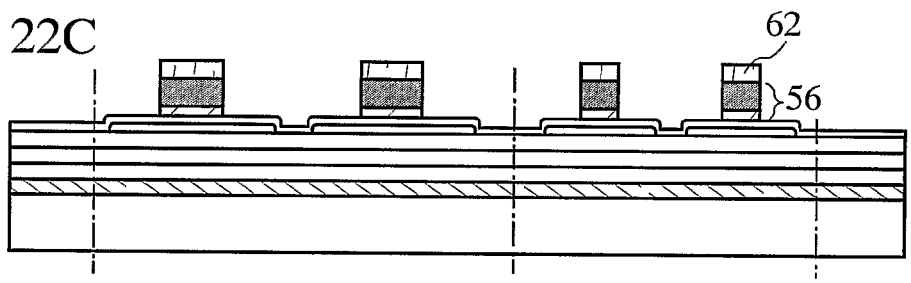
Figure 22D:
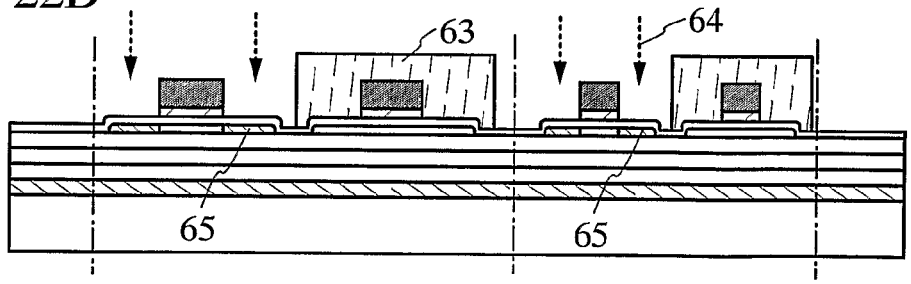
Figure 22E:
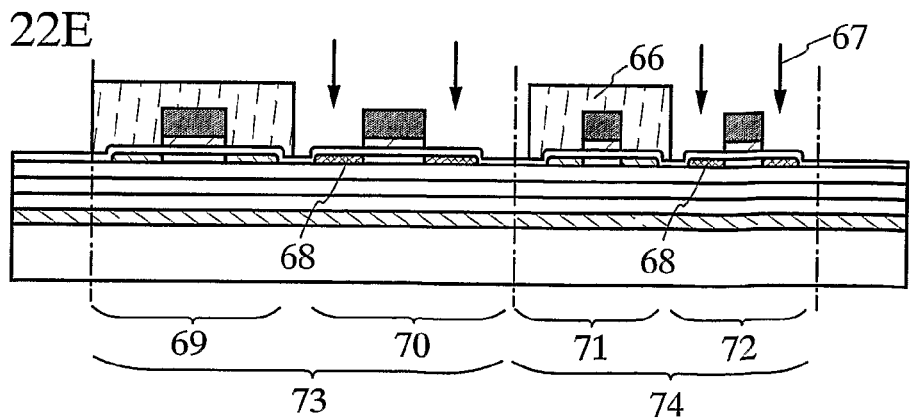

Subsequently, a gate electrode 56 is formed (FIG. 22C). In this embodiment, Si and W (tungsten) are stacked by sputtering, and etched with a resist 62 used as a mask to form the gate electrode 56. Needless to say, the material, the structure and the forming method of the gate electrode 56 are not limited to these and can be selected appropriately. For example, a stacked structure of Si and NiSi (Nickel Silicide) doped with an N-type impurity, or a laminated structure of TaN (tantalum nitride) and W (tungsten) may be employed. Alternatively, the gate electrode 56 may be formed of a single layer employing any conductive material.

A mask of $SiO_x$ or the like may be used instead of the resist mask. In this case, a patterning step of the mask such as $SiO_x$ and SiON (referred to as a hard mask) is additionally required, while the mask film is less decreased in etching as compared with the resist, thereby a gate electrode layer with a desired width can be formed. Alternatively, the gate electrode 56 may be selectively formed by droplet discharging without using the resist 62.

As for the conductive material, various kinds of materials can be selected depending on the function of the conductive film. When the gate electrode and the antenna are simultaneously formed, the material may be selected in consideration of their functions.

As an etching gas for etching the gate electrode, a mixed gas of $CF_4$, $Cl_2$ and $O_2$, or a $Cl_2$ gas is employed here, though the invention is not limited to this.

Subsequently, a resist 63 is formed so as to cover portions to be P-channel TFTs 70 and 72. An N-type impurity element 64 (typically, P (phosphorous) or As (arsenic)) is doped to the island-shaped semiconductor films of N-channel TFTs 69 and 71 at a low concentration with the gate electrode used as a mask (a first doping step (lightly doping of N-type impurity element), FIG. 22D). The first doping step is performed under such conditions as a dosage of $1 \times 10^{13}$ to $6 \times 10^{13}/cm^2$ and an accelerated voltage of 50 to 70 keV, though the invention is not limited to these conditions. In the first doping step, through doping is performed through the gate insulating film 58 to form a couple of low concentration impurity regions 65. Note that the first doping step may be performed to the entire surface without covering the P-channel TFT regions with the resist.

After the resist 63 is removed by ashing or the like, another resist 66 is formed so as to cover the N-channel TFT regions. A P-type impurity element 67 (typically, B (boron)) is doped to the island-shaped semiconductor films of the P-channel TFTs 70 and 72 at a high concentration with the gate electrode used as a mask (a second doping step (heavily doping of P-type impurity element), FIG. 22E). The second doping step is performed under such conditions as a dosage of $1 \times 10^{16}$ to $3 \times 10^{16}/cm^2$ and an accelerated voltage of 20 to 40 keV. In the second doping step, through doping is performed through the gate insulating film 58 to form a couple of P-type high concentration impurity regions 68.

Figure 23A:
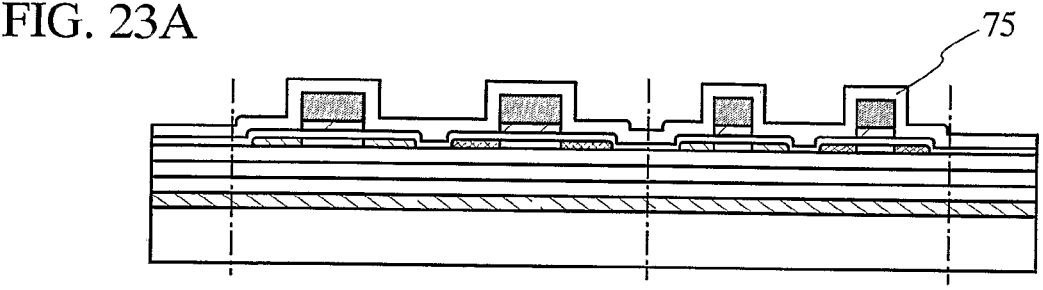
FIGS. 23A to 23D are sectional diagrams showing the manufacturing steps of the invention.
Figure 23B:
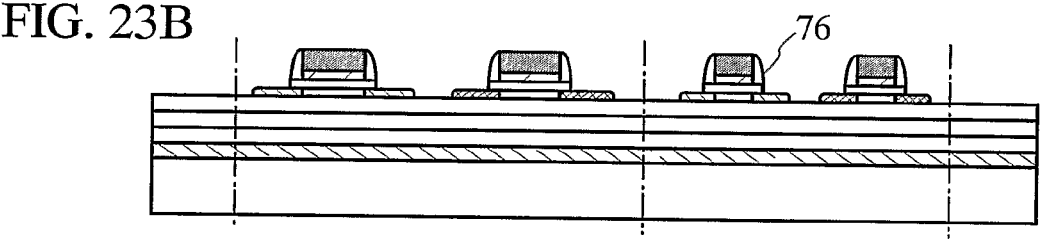
Figure 23C:
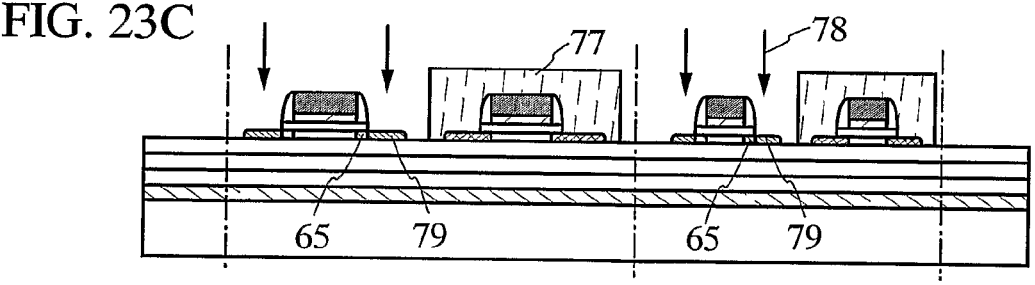

After the resist 66 is removed by ashing or the like, an insulating film 75 is formed over the entire surface of the substrate (FIG. 23A). In this embodiment, a $SiO_2$ film with a thickness of 100 nm is formed by plasma CVD. The insulating film 75 and the gate insulating film 58 are removed by etch back to form a sidewall 76 in a self-aligned manner (FIG. 23B). As an etching gas, a mixed gas of $CHF_3$ and He is employed. Note that the forming step of the sidewall is not limited to this.

Figure 24A:
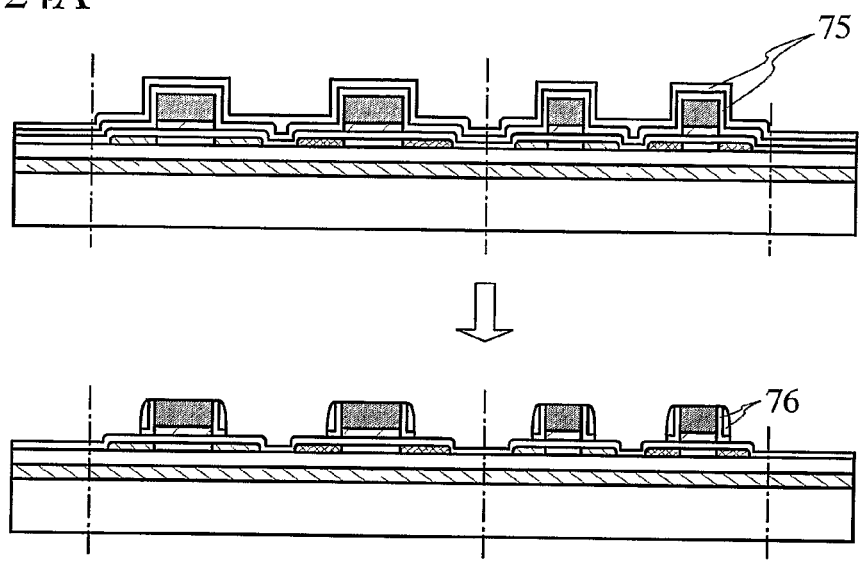
FIGS. 24A and 24B are sectional diagrams showing the manufacturing steps of the invention.

The forming method of the sidewall 76 is not limited to the aforementioned one. For example, methods shown in FIGS. 21A and 21B may be employed as well. FIG. 24A shows the insulating film 75 having a stacked-layer structure of two or more layers. The insulating film 75 has, for example, a two-layer structure of a SiON (silicon oxynitride) film with a thickness of 100 nm and an LTO (Low Temperature Oxide) film with a thickness of 200 nm. In this embodiment, the SiON film is formed by plasma CVD, and the LTO film is obtained by forming a $SiO_2$ film by low pressure CVD. Then, etch back is performed to form the sidewall 76 having an L shape and an arc shape.

Figure 24B:
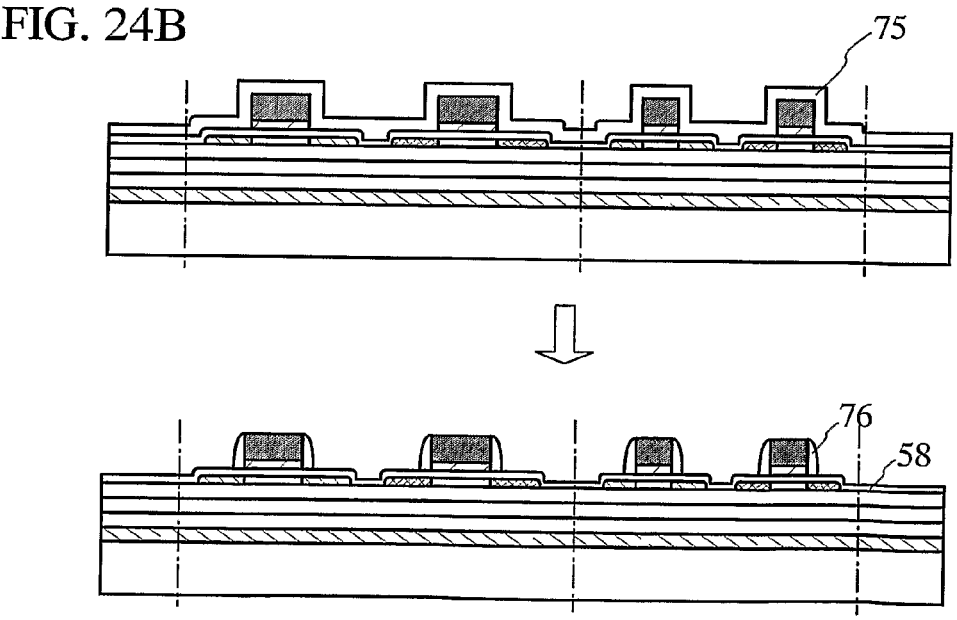

FIG. 24B shows the case where etching is performed so that the gate insulating film 58 is not removed by the etch back. The insulating film 75 in this case may be formed of a single layer or stacked layers.

The sidewall 76 serves as a mask when an N-type impurity is doped at a high concentration in the subsequent step to form a low concentration impurity region or a non-doped offset region under the sidewall 76. In any of the aforementioned forming methods of the sidewall, the conditions of the etch back may be changed depending on the width of the low concentration impurity region or the offset region to be formed.

Subsequently, another resist 77 is formed so as to cover the P-channel TFT regions. An N-type impurity element 78 (typically, P or As) is doped at a high concentration with the gate electrode 56 and the sidewall 76 used as masks (a third doping step (heavily doping of N-type impurity element), FIG. 23C). The third doping step is performed under such conditions as a dosage of $1 \times 10^{13}$ to $5 \times 10^{15}/cm^2$ and an accelerated voltage of 60 to 100 keV. In the third doping step, a couple of N-type high concentration impurity regions 79 are formed.

After the resist 77 is removed by ashing or the like, thermal activation of the impurity regions may be performed. For example, a SiON film with a thickness of 50 nm is formed, and then heat treatment is performed at a temperature of 550° C. for four hours in a nitrogen atmosphere. Alternatively, it is also possible that a $SiN_x$ film containing hydrogen is formed to have a thickness of 100 nm and heat treatment is performed at a temperature of 410° C. for one hour in a nitrogen atmosphere. According to this, defects in the crystalline semiconductor film can be improved. This step enables to, for example, terminate a dangling bond in the crystalline silicon and is called a hydrotreatment step or the like. Then, a SiON film with a thickness of 600 nm is formed as a cap insulating film for protecting the TFT. Note that the aforementioned hydrotreatment step may be performed after the formation of this SiON film. In that case, a $SiN_x$ film and a SiON film thereon may be continuously formed. In this manner, the insulating film includes three layers of SiON, $SiN_1$ and SiON that are formed in this order from the substrate side over the TFT, though the structure and the material are not limited to these. Note that such an insulating film is preferably formed, since it also has a function to protect the TFT.

Figure 23D:
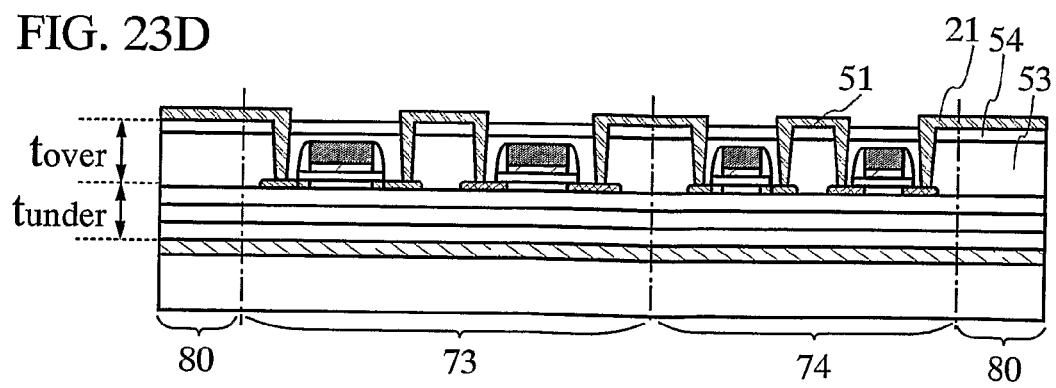

Subsequently, an interlayer film 53 is formed over the TFT (FIG. 23D). For the interlayer film 53, a heat resistant organic resin such as polyimide, acrylic, polyamide, and siloxane may be employed. The interlayer film 53 may be formed by spin coating, dipping, spray application, droplet discharging (inkjet printing, screen printing, offset printing or the like), a doctor knife, a roll coater, a curtain coater, a knife coater, or the like depending on the material thereof. Alternatively, an inorganic material may be employed such as a film of silicon oxide, silicon nitride, silicon oxynitride, PSG (phosphosilicate glass), BPSG (boron phosphosilicate glass), and alumina. These insulating films may be stacked to form the interlayer film 53 as well.

A protective film 54 may be formed over the interlayer film 53. As the protective film 54, a film containing carbon such as DLC (Diamond Like Carbon) and carbon nitride (CN), a silicon oxide film, a silicon nitride film, a silicon nitride oxide film, or the like may be employed. The protective film 54 may be formed by plasma CVD, atmospheric pressure plasma, or the like. Alternatively, a photosensitive or nonphotosensitive organic material such as polyimide, acrylic, polyamide, resist, and benzocyclobutene, or a heat resistant organic resin such as siloxane may be employed.

A filler may be mixed into the interlayer film 53 or the protective film 54 in order to prevent these films from being detached or cracked due to stress generated by a difference of thermal expansion coefficients between the interlayer film 53 or the protective film 54 and a conductive material or the like of a wiring that is formed later.

After forming a resist, etching is performed to form contact holes, so that a wiring 51 for connecting the TFTs to each other and a connecting wiring 21 connected to an external antenna are formed (FIG. 23D). As an etching gas for forming the contact holes, a mixed gas of $CHF_3$ and He is employed, though the invention is not limited to this. The wiring 51 and the connecting wiring 21 may be simultaneously formed using the same material, or may be formed separately. In this embodiment, the wiring 51 connected to the TFTs has a five-layer structure of Ti, TiN, Al—Si, Ti, and TiN that is formed in this order by sputtering and patterning.

By mixing Si into the Al layer, hillock can be prevented from generating in the resist baking when the wiring is patterned. Instead of Si, Cu of about 0.5% may be mixed. When the Al—Si layer is sandwiched by Ti and TiN, hillock resistance can be further improved. In the patterning, the aforementioned hard mask of SiON or the like is preferably employed. It is to be noted here that the material and the forming method of the wirings are not limited to these, and the aforementioned material for forming the gate electrode may be employed as well.

In this embodiment, the TFT regions for constituting a CPU 73, a memory 74 or the like and a terminal portion 80 connected to an antenna are integrally formed. This embodiment can also be applied to the case where the TFT regions and the antenna are integrally formed. In that case, it is preferable that the antenna be formed over the interlayer film 53 or the protective film 54, and then covered with another protective film. As the conductive material of the antenna, Ag, Au, Al, Cu, Zn, Sn, Ni, Cr, Fe, Co, Ti, or an alloy containing them may be employed, though the invention is not limited to these. The wiring and the antenna may be formed of different materials from each other. It is desirable that the wiring and the antenna be formed of a metal material having high ductility and malleability, and more preferably, the respective thicknesses thereof are increased so as to withstand the stress due to deformation.

As for the forming method, the film may be formed over the entire surface by sputtering and patterned with a resist mask, or may be selectively formed by using a nozzle by droplet discharging. The droplet discharging here includes offset printing, screen printing or the like as well as inkjet printing. The wiring and the antenna may be formed simultaneously, or may be formed separately such that one of them is formed first, and then the other is formed thereon.

Through the aforementioned steps, a thin film integrated circuit device constituted by TFTs is completed. Although a top gate structure is employed in this embodiment, a bottom gate structure (an inverted staggered structure) may be employed as well. A region where a thin film active element such as a TFT is not formed mainly includes a base insulating film material, an interlayer insulating film material and a wiring material. This region preferably occupies 50% or more, and more preferably 70 to 95% of the whole thin film integrated circuit device. As a result, the ID chip can be easily bent, thereby its completed product such as an ID label can be easily handled. In such a case, it is preferable that an island-shaped semiconductor region (island) of the active element including the TFT portion occupy 1 to 30%, and more preferably 5 to 15% of the whole thin film integrated circuit device.

As shown in FIG. 23D, the thickness of the protective film or the interlayer film in the thin film integrated circuit device is preferably controlled so that the distance ($t_{under}$) between the semiconductor layer of the TFT and the lower protective film may be the same or substantially the same as the distance ($t_{over}$) between the semiconductor layer and the upper interlayer film (or protective film if formed). By disposing the semiconductor layer in the middle of the thin film integrated circuit device in this manner, stress applied to the semiconductor layer can be alleviated, thereby generation of cracks can be prevented.

Embodiment 8

The semiconductor device of the invention can be applied to a wireless chip, an IC card, an IC tag, an ID chip, a transponder, a bill, securities, a passport, an electronic apparatus, a bag, and a garment. In this embodiment, applications of an IC card, an ID tag and an ID chip and the like are described with reference to FIGS. 18A to 18H.

Figure 18A:
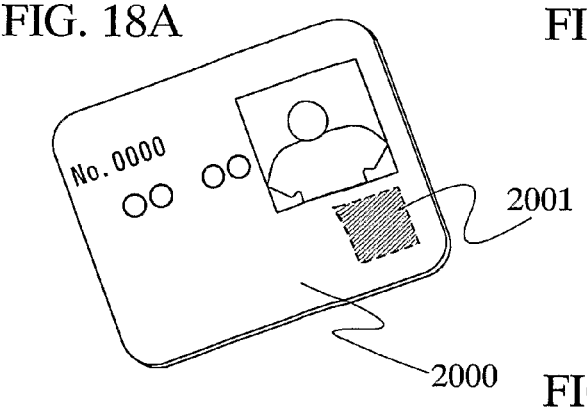
FIGS. 18A to 18H are views showing examples of application of the invention.

FIG. 18A shows an IC card that can be used for personal identification as well as for a credit card or electronic money that allows cashless payment by utilizing a rewritable memory circuit incorporated in the IC card. A circuit portion 2001 using the invention is incorporated in an IC card 2000.

Figure 18B:
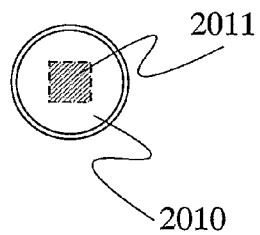

FIG. 18B shows an ID tag that can be used for personal identification as well as for entrance management of a specific area since it can be downsized. A circuit portion 2011 using the invention is incorporated in an ID tag 2010.

Figure 18C:
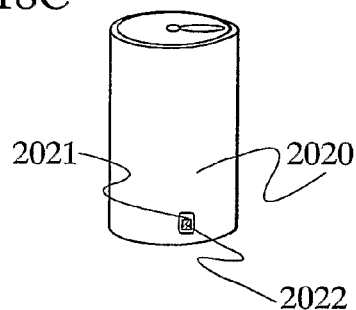

FIG. 18C shows a product 2020 attached with an ID chip 2022 that is used for goods management in retail stores such as supermarkets. The invention is applied to a circuit in the ID chip 2022. By using the ID chip in this manner, stock management can be simplified and shoplifting and the like can be prevented. Although a protective film 2021 that also functions as an adhesive is used to prevent the ID chip 2022 from falling off in the drawing, the ID chip 2022 may be attached directly to the product 2020 with an adhesive. Further, the ID chip 2022 is preferably formed by using the flexible substrate described in Embodiment 4 so as to be easily attached to the product 2020.

Figure 18D:
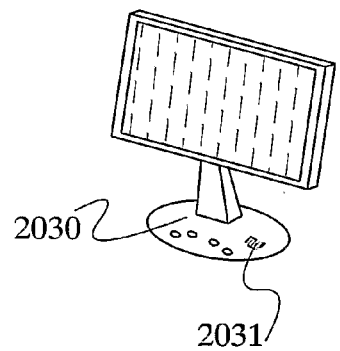

FIG. 18D shows an ID chip for identification that is incorporated in a product in the manufacture thereof. In the drawing, an ID chip 2031 is incorporated in a housing 2030 of a display as an example. The invention is applied to a circuit in the ID chip 2031. Such a structure facilitates manufacturer's identification, distribution management of products, and the like. Although the housing of a display is shown as an example in the drawing, the invention is not limited to this and can be applied to various electronic apparatuses and products.

Figure 18E:
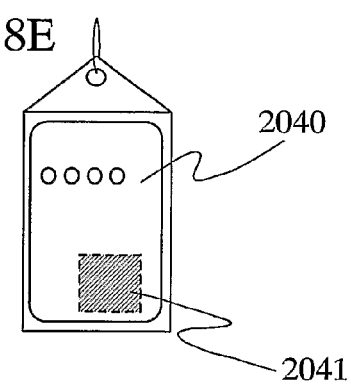

FIG. 18E shows a shipping tag for transporting objects. In the drawing, an ID chip 2041 is incorporated in a shipping tag 2040. The invention is applied to a circuit in the ID chip 2041. Such a structure facilitates selection of delivery destination, distribution management of products and the like. Although the shipping tag is formed so as to be attached to a string for tying an object in the drawing, the invention is not limited to this. Alternatively, the shipping tag may be directly attached to the object with a sealing member or the like.

Figure 18F:
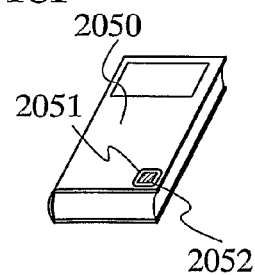

FIG. 18F shows an ID chip 2052 incorporated in a book 2050. The invention is applied to a circuit in the ID chip 2052. Such a structure facilitates distribution management in book stores, the lending process in libraries, and the like. Although a protective film 2051 that also functions as an adhesive is used to prevent the ID chip 2052 from falling off in the drawing, the ID chip 2052 may be attached directly to the book 2050 with an adhesive or incorporated in the cover of the book 2050.

Figure 18G:
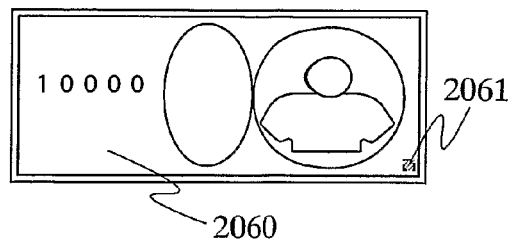

FIG. 18G shows an ID chip 2061 incorporated in a bill 2060. The invention is applied to a circuit in the ID chip 2061. Such a structure easily prevents distribution of counterfeit bills. In view of the properties of bills, it is more preferable that the ID chip 2061 be incorporated in the bill 2060 so as not to be peeled off. The invention can be applied to other paper products such as securities and a passport as well as a bill.

Figure 18H:
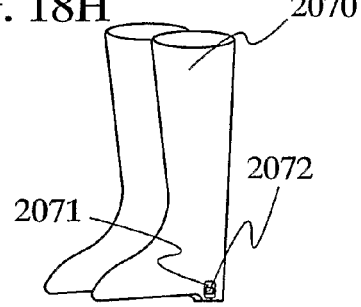

FIG. 18H shows an ID chip 2072 incorporated in a shoe 2070. The invention is applied to a circuit in the ID chip 2072. Such a structure facilitates manufacturer's identification, distribution management of products, and the like. Although a protective film 2071 that also functions as an adhesive is used to prevent the ID chip 2072 from falling off in the drawing, the ID chip 2072 may be attached directly to the shoe 2070 with an adhesive, or incorporated in the shoe 2070. The invention can be applied to other articles such as a bag and a garment as well as shoes.

Described hereinafter is the case where an ID chip is incorporated in various objects in order to protect the security thereof. As for the security protection, anti-theft security and anti-counterfeit security are considered.

Figure 25:
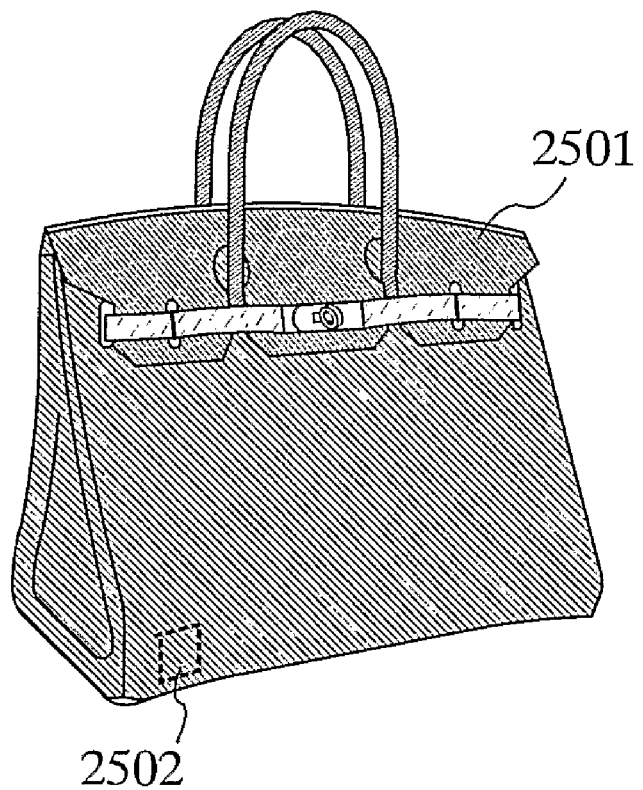
FIG. 25 is a view showing a bag using the invention.

For example, an ID chip is incorporated in a bag for anti-theft security. As shown in FIG. 25, an ID chip 2502 is incorporated in a bag 2501. The ID chip 2502 can be incorporated in the bottom or a side of the bag 2501, for example. Being extremely thin and small, the ID chip 2502 can be incorporated in the bag 2501 while maintaining an attractive design thereof. In addition, the ID chip 2502 transmits light, thus a thief cannot easily find out whether the ID chip 2502 is incorporated. Accordingly, there is no fear that the ID chip 2502 may be removed by the thief.

If such a bag incorporating the ID chip is stolen, data on the present position of the bag can be obtained by using, for example, GPS (Global Positioning System). Note that the GPS is a system for determining the position with the time difference between the time a signal was transmitted by a GPS satellite and the time it was received.

Besides the stolen products, the present position of a thing lost or left behind can be determined by the GPS.

Besides the bag, the ID chip can be incorporated in a vehicle such as a car and a bicycle, a watch, and accessories.

Described now is the case where an ID chip is incorporated in a passport, a driver's license and the like for anti-counterfeit security.

Figure 26A:
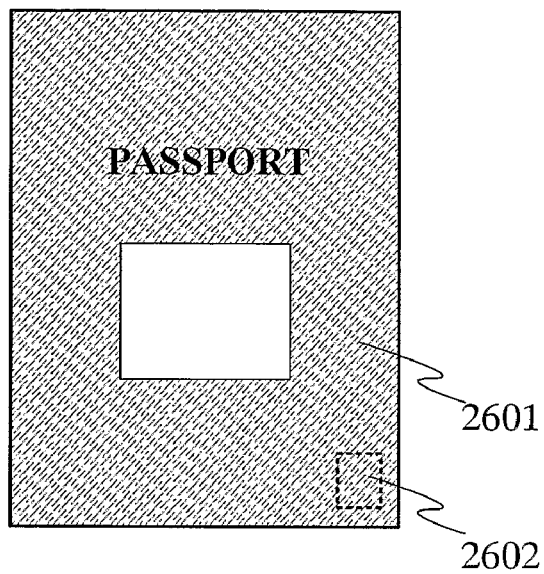
FIGS. 26A and 26B are views of certificates using the invention.

FIG. 26A shows a passport 2601 incorporating an ID chip. Although an ID chip 2602 is incorporated in the cover of the passport 2601 in FIG. 26A, it may be incorporated in other pages. As the ID chip 2602 transmits light, it may also be mounted on the surface of the cover. Further, the ID chip 2602 may be sandwiched between materials of the cover or the like to be incorporated in the cover.

Figure 26B:
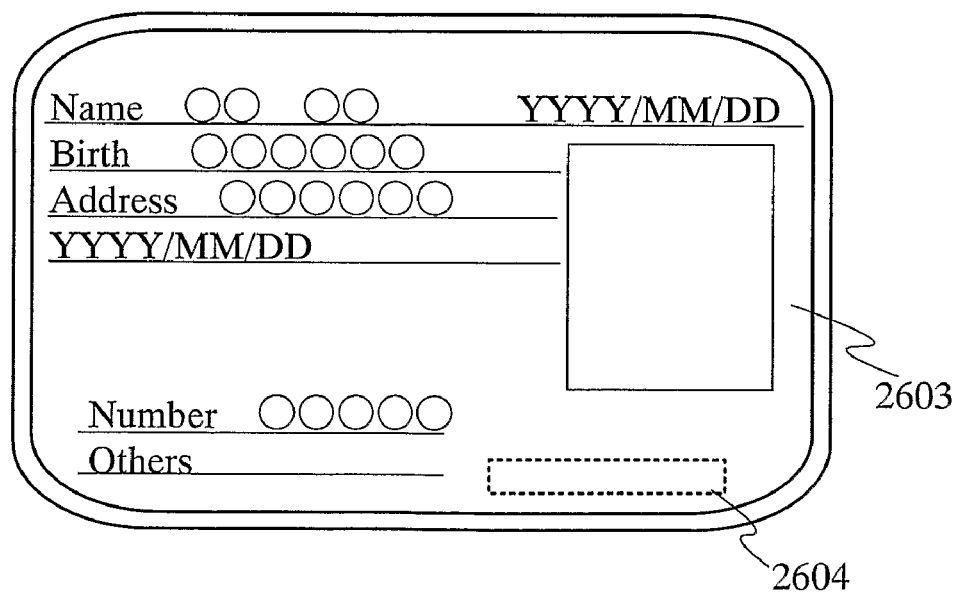

FIG. 26B shows a driver's license 2603 incorporating an ID chip. In FIG. 26B, an ID chip 2604 is incorporated in the driver's license 2603. Since the ID chip 2604 transmits light, it may be mounted on a printed surface of the driver's license 2603. For example, the ID chip 2604 may be mounted on a printed surface of the driver's license 2603 and covered with a laminate film. Alternatively, the ID chip 2604 may be sandwiched between materials of the driver's license 2603 and incorporated in it.

When the ID chip is incorporated in the aforementioned objects, counterfeiting thereof can be prevented. The counterfeiting of the aforementioned bag can also be prevented by incorporating the ID chip. In addition, design of the passport, the driver's license and the like can be maintained since an extremely thin and small ID chip is used. Further, the ID chip, which transmits light, can be mounted on the surface of the products.

The ID chip also facilitates the management of the passport, the driver's license and the like. In addition, data can be stored in the ID chip without being written directly to the passport, the driver's license and the like, resulting in privacy protection.

Figure 27:
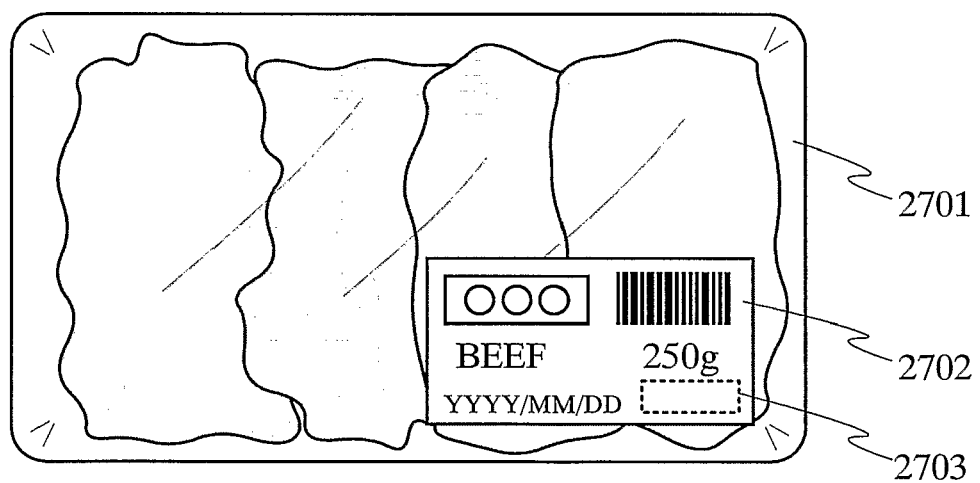
FIG. 27 is a view showing food management using the invention.

An ID chip that is provided in products such as groceries for safety control is shown in FIG. 27.

FIG. 27 shows a display label 2702 provided with an ID chip 2703, which is attached to a package of meat 2701. The ID chip 2703 may be mounted on the surface of or incorporated in the display label 2702. The ID chip may also be mounted on a cellophane for wrapping fresh food such as vegetables.

The ID chip 2703 can store basic data on the product such as a production area, a producer, a processing date, and a use-by date, as well as additional data such as a serving suggestion for the product. The basic data which is not required to be rewritten may be stored in a non-rewritable memory such as an MROM. Meanwhile, the additional data may be stored in a rewritable and erasable memory such as an EEPROM.

For safety control of food, it is important to obtain data on plants and animals that are not yet processed. In order to do this, an ID chip may be implanted in plants and animals and data thereon may be obtained by a reader device. The data on plants and animals includes a breeding area, a feed, a breeder, presence and absence of infection, and the like.

When the price of a product is stored in the ID chip, payment of the product can be made more simply in a shorter time than the case of a conventional bar code being used. That is, a plurality of products each incorporating the ID chip can be paid at a time. In the case of reading a plurality of ID chips, a reader device is required to be equipped with an anti-collision function.

Further, depending on communication distance of the ID chip, payment of the products can be made at the cash register even when there is a distance between the products and the cash register, and shoplifting and the like can also be prevented.

The ID chip can be used in combination with other information media such as bar code and magnetic tape. For example, basic data that is not required to be rewritten may be stored in the ID chip whereas data to be rewritten such as discount price and bargain information may be stored in the bar code. The data of the bar code can be easily modified unlike that of the ID chip.

As set forth above, providing the ID chip increases the amount of information given to consumers, thus they can purchase products at ease.

Figure 28A:
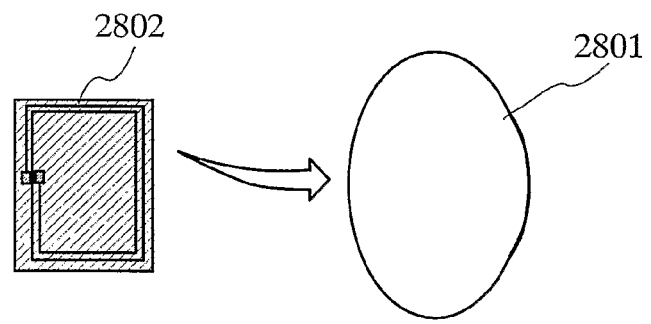
FIGS. 28A and 28B are views showing distribution management using the invention.

Described next is the case of providing an ID chip in products such as a beer bottle for distribution management. As shown in FIG. 28A, an ID chip 2802 is provided for a beer bottle using, for example, a label 2801.

Figure 28B:
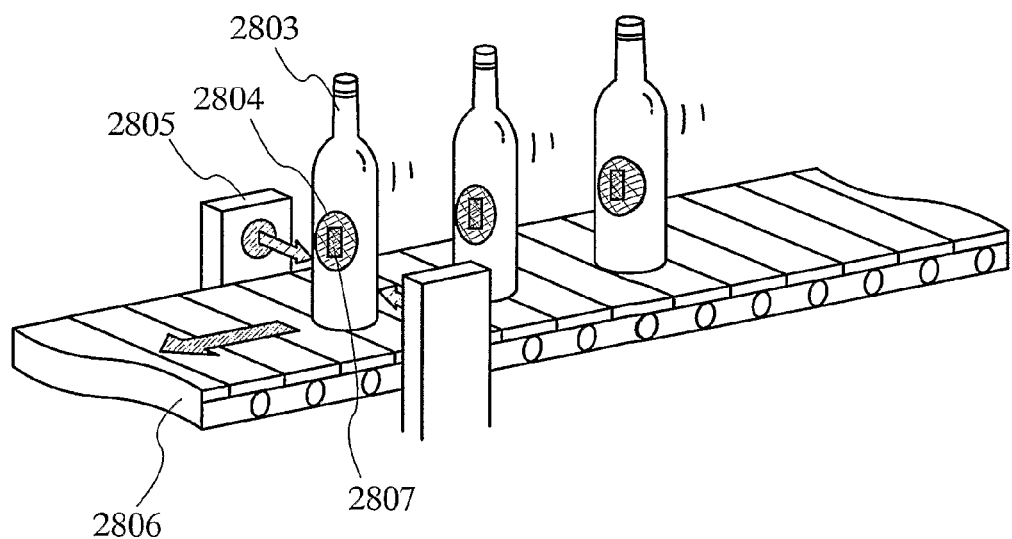

The ID chip 2802 stores basic data such as a manufacturing date, a manufacturing area and ingredients. Such basic data is not required to be rewritten, thus it may be stored in a non-rewritable memory such as an MROM. The ID chip also stores individual data such as a delivery address and a delivery date of the beer bottle. For example, as shown in FIG. 28B, when each beer bottle 2803 moving on a conveyor belt 2806 passes a writer device 2805, each delivery address and delivery date can be stored in an ID chip 2807 incorporated in a label 2804. Such individual data may be stored in a rewritable and erasable memory such as an EEPROM.

A system is preferably configured such that when data on a purchased product is transmitted from a delivery destination to a distribution management center via a network, the delivery address and date are calculated by a writer device, a personal computer for controlling the writer device, or the like, and then stored in the ID chip.

Since the bottles are delivered per case, the ID chip may be provided for each case or every several cases to store individual data.

When the ID chip is provided for such drinks that may store a plurality of delivery addresses, the time required for manual data input can be reduced, resulting in reduced input error. In addition, it is possible to lower labor costs that are the most costly expenses in the distribution management. Thus, providing the ID chip allows the distribution management to be performed with few errors at low cost.

Additional data such as food to go with beer and a recipe with beer may be stored at the delivery destination. As a result, the food and the like can be promoted and consumers' willingness to buy can be increased. Such additional data may be stored in a rewritable and erasable memory such as an EEPROM. In this manner, providing the ID chip increases the amount of information given to consumers, thus they can purchase products at ease.

A product provided with an ID chip for manufacturing management is described as well as a manufacturing apparatus (manufacturing robot) controlled based on data of the ID chip.

In recent years, original products are often manufactured, and they are manufactured on a production line based on its original data. For example, in a production line of cars that can provide free color choice of doors, an ID chip is provided in a part of each car and a painting apparatus is controlled based on the data of the ID chip. Accordingly, an original car can be manufactured.

When the ID chip is provided, there is no need to control the order and color of cars to be put into a production line in advance. Therefore, it is not necessary to set the order and number of cars, and a program for controlling a painting apparatus in accordance with the order and number of cars. That is, a manufacturing apparatus can operate individually based on data of the ID chip provided in each car.

As set forth above, the ID chip can be applied to various fields. Based on the data stored in the ID chip, individual manufacturing data can be obtained and the manufacturing apparatus can be controlled based on the individual data.

Figure 29:
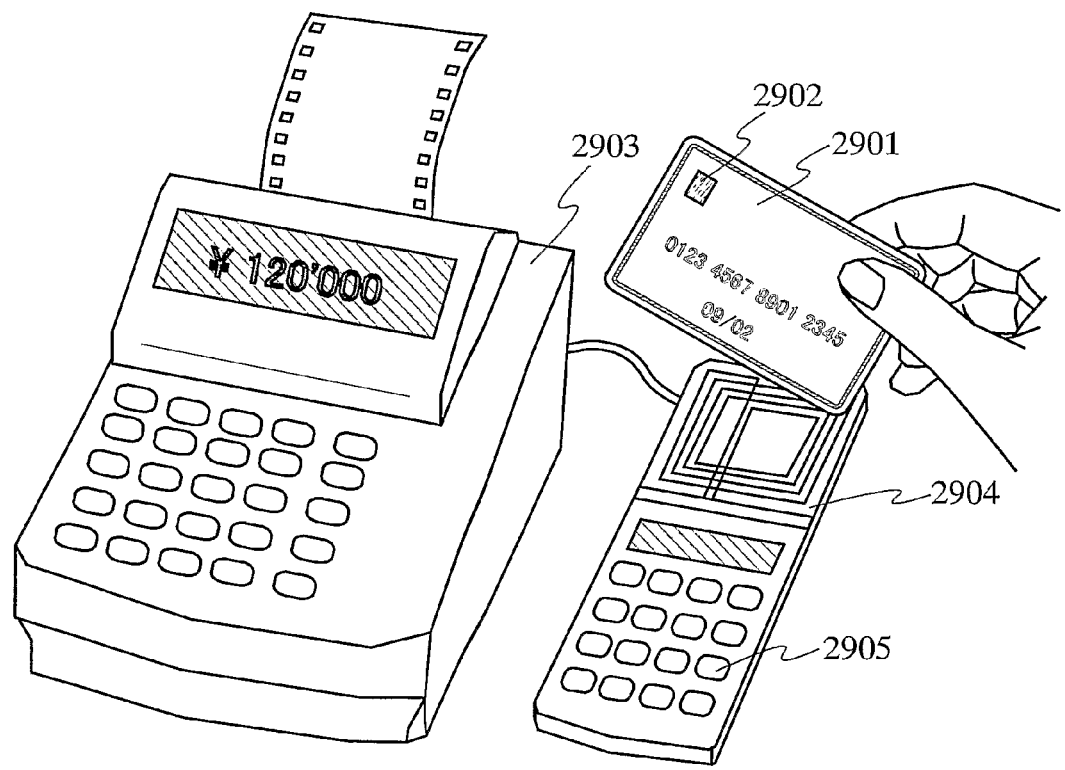
FIG. 29 is a view showing IC card payment using the invention.

Described hereinafter is an IC card comprising the ID chip of the invention, which is used as electronic money. FIG. 29 shows an IC card 2901 that is used to make payment. The IC card 2901 comprises an ID chip 2902 of the invention. A cash register 2903 and a reader/writer 2904 are needed for using the IC card 2901. The ID chip 2902 stores data of the sum of money on the IC card 2901, and the data of the sum can be read wirelessly by the reader/writer 2904 and transmitted to the cash register 2903. The cash register 2903 verifies that the amount to be paid is less than the sum on the IC card 2901, and then payment is made. Subsequently, data of the amount of balance of the money after the payment is transmitted to the reader/writer 2904, and written to the ID chip 2902 of the IC card 2901 by the reader/writer 2904.

The reader/writer 2904 may be equipped with a key 2905 for inputting a password and the like, thereby the IC card 2901 can be prevented from being used by a third party without notice.

The application shown in this embodiment is just an example, and the invention is not limited to this.

As set forth above, the application range of the invention is so wide that the ID chip of the invention can be applied for identification of all products. This embodiment can be implemented in combination with embodiment mode and Embodiments 1 to 8.

This application is based on Japanese Patent Application serial no. 2004-068450 filed in Japan Patent Office on 11, Mar. 2004, the contents of which are hereby incorporated by reference.

EXPLANATION OF REFERENCE

21 . . . connecting wiring, 51 . . . wiring, 53 . . . interlayer film, 54 . . . protective film, 55 . . . protective film, 56 . . . gate electrode, 57 . . . island-shaped semiconductor film, 58 . . . gate insulating film, 60 . . . substrate, 61 . . . peeling layer, 62 . . . resist, 63 . . . resist, 64 . . . impurity element, 65 . . . low concentration impurity region, 66 . . . resist, 67 . . . impurity element, 68 . . . high concentration impurity region, 69 . . . N-channel TFT, 70 . . . P-channel TFT, 71 . . . N-channel TFT, 72 . . . P-channel TFT, 73 . . . CPU, 74 . . . memory, 75 . . . insulating film, 76 . . . sidewall, 77 . . . resist, 78 . . . impurity element, 79 . . . high concentration impurity region, 80 . . . terminal portion, 100 . . . semiconductor device, 101 . . . antenna circuit, 102 . . . rectifying circuit, 103 . . . stabilizing power source circuit, 104 . . . modulation circuit, 105 . . . amplifier, 106 . . . logic circuit, 107 . . . demodulation circuit, 108 . . . amplifier, 109 . . . logic circuit, 110 . . . FeRAM control circuit, 111 . . . FeRAM circuit, 200 . . . semiconductor device, 201 . . . antenna circuit, 202 . . . rectifying circuit, 203 . . . stabilizing power source circuit, 204 . . . modulation circuit, 205 . . . amplifier, 206 . . . logic circuit, 207 . . . demodulation circuit, 208 . . . amplifier, 209 . . . logic circuit, 210 . . . memory control circuit, 211 . . . memory circuit, 301 . . . antenna coil, 302 . . . tuning capacitor, 303 and 304 . . . diodes, 305 . . . smoothing capacitor, 401 . . . ID chip, 402 . . . antenna unit, 403 . . . interrogator, 404 . . . bag, 500 . . . memory cell, 501 . . . bit line decoder, 502 . . . word line decoder, 503 . . . plate line decoder, 504 . . . precharge circuit, 505 to 512 . . . N-channel memory transistors (transistors), 513 to 520 . . . ferroelectric capacitors, 521 to 524 . . . bit lines, 525 and 526 . . . word lines, 527 and 528 . . . plate lines, 529 and 530 . . . sense amplifiers, 531 and 532 . . . sense amplifier selecting switches, 533 to 536 . . . precharge switches, 537 to 540 . . . bit line selecting switches, 541 and 542 . . . input terminals, 543 . . . output terminal, 700 . . . memory cell, 701 . . . bit line decoder, 702 . . . word line decoder, 703 . . . plate line decoder, 704 . . . precharge circuit, 705 to 708 . . . N-channel memory transistors (transistors), 709 to 712 . . . ferroelectric capacitors, 713 and 714 . . . bit lines, 715 and 716 . . . word lines, 717 and 718 . . . plate lines, 719 and 720 . . . sense amplifiers, 721 and 722 . . . sense amplifier selecting switches, 723 and 724 . . . precharge switches, 725 and 726 . . . bit line selecting switches, 727 . . . input terminal, 728 . . . output terminal, 901 . . . decode circuit, 902 . . . delay circuit, 903 . . . switch, 904 . . . 1-bit FeRAM circuit, 1000 . . . substrate, 1001 . . . antenna, 1002 . . . circuit, 1003 . . . substrate, 1004 . . . antenna, 1005 . . . circuit, 1006 . . . substrate, 1007 . . . antenna, 1008 . . . circuit, 1009 . . . substrate, 1010 . . . antenna, 1011 . . . circuit, 1012 . . . substrate, 1013 . . . antenna, 1014 . . . circuit, 1100 . . . substrate (top substrate), 1101 . . . antenna (antenna wiring), 1301 . . . decode circuit, 1302 . . . delay circuit, 1303 . . . switch, 1304 . . . volatile memory circuit, 2000 . . . IC card, 2001 . . . circuit portion, 2010 . . . ID tag, 2011 . . . circuit portion, 2020 . . . product, 2021 . . . protective film, 2022 . . . ID chip, 2030 . . . housing, 2031 . . . ID chip, 2040 . . . shipping tag, 2041 . . . ID chip, 2050 . . . book, 2051 . . . protective film, 2052 . . . ID chip, 2060 . . . bill, 2061 . . . ID chip, 2070 . . . shoe, 2071 . . . protective film, 2072 . . . ID chip, 2201 . . . resistor, 2202 . . . transistor, 2203 . . . transistor, 2204 . . . current supply resistor, 2205 to 2209 . . . transistors, 2210 . . . resistor, 2301 . . . flexible protective layer (protective layer), 2302 . . . ID chip, 2303 . . . flexible protective layer (protective layer), 2304 . . . antenna, 2501 . . . bag, 2502 . . . ID chip, 2601 . . . passport, 2602 . . . ID chip, 2603 . . . driver's license 2604 . . . ID chip, 2701 . . . package, 2702 . . . display label, 2703 . . . ID chip, 2801 . . . label, 2802 . . . ID chip, 2803 . . . beer bottle, 2804 . . . label, 2805 . . . writer device, 2806 . . . conveyor belt, 2807 . . . ID chip, 2901 . . . IC card, 2902 . . . ID chip, 2903 . . . register, 2904 . . . reader/writer, 2905 . . . key, 4000 . . . substrate, 4001 and 4002 . . . base films, 4003 to 4005 . . . island-shaped semiconductor layers, 4006 . . . gate insulating film, 4100 to 4102 . . . gate electrodes, 4103 to 4108 . . . low concentration P-type impurity regions, 4109 and 4100 . . . high concentration N-type impurity regions, 4111 to 4114 . . . high concentration N-type impurity regions, 4115 . . . interlayer insulating film, 4201 . . . bottom electrode layer, 4202 . . . ferroelectric layer, 4203 . . . top electrode layer, 4300 to 4306 . . . wirings, 4307 . . . interlayer insulating film, 4308 . . . protective film

The invention claimed is:

1. A semiconductor device comprising:
 a modulation circuit;
 a demodulation circuit;
 a logic circuit connected to the demodulation circuit;
 an antenna circuit which is electrically connected to the modulation circuit and the demodulation circuit;
 a memory circuit for storing an output signal of the logic circuit; and
 a control circuit configured to limit data writing of the memory circuit so that data is written to the memory circuit only once,
 wherein the memory circuit comprises a ferroelectric capacitor.

2. A semiconductor device comprising:
 a modulation circuit;
 a demodulation circuit;
 a logic circuit connected to the demodulation circuit;
 an antenna circuit which is electrically connected to the modulation circuit and the demodulation circuit;
 a memory circuit for storing an output signal of the logic circuit; and
 means for controlling data writing of the memory circuit so that data is written to the memory circuit only once,
 wherein the memory circuit comprises a ferroelectric capacitor.

3. The semiconductor device according to claim 1 or 2, wherein a memory cell that forms the memory circuit includes two transistors and two ferroelectric capacitors.

4. The semiconductor device according to claim 1 or 2, wherein a memory cell that forms the memory circuit includes one transistor and one ferroelectric capacitor.

5. The semiconductor device according to claim 1 or 2, wherein at least one of the modulation circuit, the demodulation circuit, the logic circuit, and the memory circuit is constituted by a thin film transistor.

6. The semiconductor device according to claim 1 or 2, wherein the antenna circuit, the modulation circuit, the demodulation circuit, the logic circuit, and the memory circuit are provided over the same insulating substrate.

7. The semiconductor device according to claim 1 or 2, wherein the modulation circuit, the demodulation circuit, the logic circuit, and the memory circuit are integrally formed over the same insulating substrate, and
 wherein the antenna circuit is provided over another insulating substrate.

8. The semiconductor device according to claim 6, wherein the insulating substrate is a glass substrate.

9. The semiconductor device according to claim 6, wherein the insulating substrate is a plastic substrate.

10. The semiconductor device according to claim 6, wherein the insulating substrate is an insulator in a film form.

11. The semiconductor device according to claim 1 or 2, wherein the antenna circuit is provided over at least one of the modulation circuit, the demodulation circuit, the logic circuit, and the memory circuit.

12. The semiconductor device according to claim 1 or 2, wherein a signal inputted to the antenna circuit is a wireless signal.

13. A product having the semiconductor device according to claim 1 or 2, wherein the product is selected from the group consisting of a wireless chip, an IC card, an IC tag, a transponder, a bill, securities, a passport, a bag, and a garment.

14. A product having the semiconductor device according to claim 1 or 2, wherein the product is an electronic apparatus.

* * * * *

UNITED STATES PATENT AND TRADEMARK OFFICE
CERTIFICATE OF CORRECTION

PATENT NO. : 7,675,795 B2
APPLICATION NO. : 10/591275
DATED : March 9, 2010
INVENTOR(S) : Jun Koyama It is certified that error appears in the above-identified patent and that said Letters Patent is hereby corrected as shown below:

At column 14, line 23, please change "ITT" to --TFT--;

At column 14, line 24, please change "Fist" to --First--.

Signed and Sealed this

Third Day of August, 2010

David J. Kappos
*Director of the United States Patent and Trademark Office*